(12) United States Patent
Noll et al.

(10) Patent No.: US 10,891,234 B2
(45) Date of Patent: Jan. 12, 2021

(54) CACHE PARTITIONING TO ACCELERATE CONCURRENT WORKLOADS

(71) Applicant: SAP SE, Walldorf (DE)

(72) Inventors: Stefan Noll, Sandhausen (DE); Norman May, Karlsruhe (DE); Alexander Martin Böhm, Schwetzingen (DE); Jens Thilo Teubner, Dortmund (DE)

(73) Assignee: SAP SE, Walldorf (DE)

( * ) Notice: Subject to any disclaimer, the term of this patent is extended or adjusted under 35 U.S.C. 154(b) by 289 days.

(21) Appl. No.: 15/945,244

(22) Filed: Apr. 4, 2018

(65) Prior Publication Data

US 2019/0310943 A1    Oct. 10, 2019

(51) Int. Cl.
| | |
|---|---|
| *G06F 12/0891* | (2016.01) |
| *G06F 16/22* | (2019.01) |
| *G06F 16/2455* | (2019.01) |
| *G06F 12/0897* | (2016.01) |
| *G06F 12/084* | (2016.01) |
| *G06F 12/0864* | (2016.01) |
| *G06F 12/126* | (2016.01) |

(52) U.S. Cl.
CPC ........ *G06F 12/0891* (2013.01); *G06F 12/084* (2013.01); *G06F 12/0864* (2013.01); *G06F 12/0897* (2013.01); *G06F 12/126* (2013.01); *G06F 16/2282* (2019.01); *G06F 16/2456* (2019.01); *G06F 16/24552* (2019.01); *G06F 2212/1021* (2013.01); *G06F 2212/1044* (2013.01)

(58) Field of Classification Search
None
See application file for complete search history.

(56) References Cited

U.S. PATENT DOCUMENTS

| 6,629,207 B1 | 9/2003 | Yoshioka et al. |
| 2012/0011144 A1 | 1/2012 | Transier et al. |
(Continued)

FOREIGN PATENT DOCUMENTS

WO    WO-2010-111636 A1    9/2010

OTHER PUBLICATIONS

Lee et al., MCC-DB: Minimizing Cache Conflicts in Multi-core Processors for Databases, 2009, VLDB Endowment/ACM, pp. 373-384 (12 pages) (Year: 2009).*

(Continued)

*Primary Examiner* — Gary W. Cygiel
(74) *Attorney, Agent, or Firm* — Sterne, Kessler, Goldstein & Fox P.L.L.C.

(57) ABSTRACT

Disclosed herein are system, method, and computer program product embodiments for cache partitioning to accelerate concurrent workload performance of in-memory databases. An embodiment operates by storing a first bitmask, associating the first bitmask with a first processor core, setting a subset of the bits of the first bitmask, wherein the subset of the bits of the first bitmask represents a first portion of shared last-level cache, and wherein any part of the first bitmask excluding the subset of the bits of the first bitmask represents a second portion of the lowest-level cache, and disallowing eviction of any cache line in the second portion of the lowest-level cache by the first processor core.

20 Claims, 15 Drawing Sheets

(56) References Cited

U.S. PATENT DOCUMENTS

2017/0344593 A1    11/2017    Mullick et al.
2018/0373635 A1*  12/2018    Mukherjee ......... G06F 12/0848

OTHER PUBLICATIONS

P.-A. Larson and J. Levandoski, "Modern Main-memory Database Systems," *Proc. VLDB*, vol. 9, No. 13, pp. 1609-1610, Sep. 2016.

A. Böhm, J. Dittrich, N. Mukherjee, I. Pandis, and R. Sen, "Operational Analytics Data Management Systems," *Proc. VLDB*, vol. 9, No. 13, pp. 1601-1604, Sep. 2016.

Intel Corporation, "Improving Real-Time Performance by Utilizing Cache Allocation Technology," *White Paper*, Apr. 2015.

F. Färber, N. May, W. Lehner, P. Große, I. Müller, H. Rauhe, and J. Dees, "The SAP HANA Database—An Architecture Overview," *Data Eng'g Bull.*, vol. 35, No. 1, pp. 28-33, 2012.

D. J. Abadi, S. R. Madden, and N. Hachem. "Column-stores vs. Rowstores: How Different Are They Really?" in *Proc. SIGMOD*. New York, NY, USA: ACM, 2008, pp. 967-980.

O. Polychroniou and K. A. Ross, "Vectorized Bloom Filters for Advanced SIMD Processors," in *Proc. DaMoN*. New York, NY, USA: ACM, 2014, pp. 6:1-6:6.

T. Willhalm, N. Popovici, Y. Boshmaf, H. Plattner, A. Zeier, and J. Schaffner, "SIMD-Scan: Ultra Fast In-Memory Table Scan Using On-Chip Vector Processing Units," *Proc. VLDB*, vol. 2, No. 1, pp. 385-394, Aug. 2009.

T. Willhalm, I. Oukid, I. Müller, and F. Faerber. "Vectorizing Database Column Scans with Complex Predicates," in *ADMS*, Riva del Garda, Trento, Italy, 2013, pp. 1-12.

Y. Ye, K. A. Ross, and N. Vesdapunt, "Scalable Aggregation on Multicore Processors," in *Proc. DaMoN*. New York, NY, USA: ACM, 2011, pp. 1-9.

T. Willhalm, R. Dementiev, and P. Fay, "Intel Performance Counter Monitor," 2017. [Online]. Available: www.intel.com/software/pcm.

R. Lee, X. Ding, F. Chen, Q. Lu, and X. Zhang, "MCC-DB: Minimizing Cache Conflicts in Multi-core Processors for Databases," *Proc. VLDB*, vol. 2, No. 1, pp. 373-384, Aug. 2009.

J. Lin, Q. Lu, X. Ding, Z. Zhang, X. Zhang, and P. Sadayappan, "Gaining Insights into Multicore Cache Partitioning: Bridging the Gap Between Simulation and Real Systems," in *Proc. HPCA*. IEEE Computer Society, Feb. 2008, pp. 367-378.

X. Zhang, S. Dwarkadas, and K. Shen, "Towards Practical Page Coloring-based Multicore Cache Management," in *Proc. EuroSys*. New York, NY, USA: ACM, 2009, pp. 89-102.

Intel Corporation, "User Interface for Resource Allocation in Intel Resource Director Technology," *Documentation of the Linux Kernel*, 2017. [Online]. Available: https://www.kernel.org/doc/Documentation/x86/intel_rdt_ui.txt.

I. Psaroudakis, T. Scheuer, N. May, A. Sellami, and A. Ailamaki, "Scaling Up Concurrent Main-memory Column-store Scans: Towards Adaptive NUMA-aware Data and Task Placement," *Proc. VLDB*, vol. 8, No. 12, pp. 1442-1453, Aug. 2015.

S. Manegold, P. Boncz, and M. Kersten, "Optimizing Main-Memory Join on Modern Hardware," *Trans. Know. and Data Eng.*, vol. 14, No. 4, pp. 709-730, Jul. 2002.

C. Balkesen, G. Alonso, J. Teubner, and M. T. Özsu, "Multi-core, Mainmemory Joins: Sort vs. Hash Revisited," Proc. VLDB, vol. 7, No. 1, pp. 85-96, Sep. 2013.

I. Müller, P. Sanders, A. Lacurie, W. Lehner, and F. Färber, "Cache-Efficient Aggregation: Hashing Is Sorting," in *Proc. SIGMOD*. New York, NY, USA: ACM, 2015, pp. 1123-1136.

M. Frigo, C. E. Leiserson, H. Prokop, and S. Ramachandran, "Cache-Oblivious Algorithms," in *Proc. FOCS*. Washington, DC, USA: IEEE Computer Society, 1999, pp. 285-297.

R. Cole and V. Ramachandran, "Resource Oblivious Sorting on Multicores," *ACM Trans. Parallel Comput.*, vol. 3, No. 4, pp. 23:1-23:31, Mar. 2017.

M. A. Bender, E. D. Demaine, and M. Farach-Colton, "Cache-Oblivious B-Trees," *SIAM J. Comput.*, vol. 35, No. 2, pp. 341-358, 2005.

B. He and Q. Luo, "Cache-Oblivious Query Processing," in *CIDR*, Asilomar, CA, USA, 2007, pp. 44-55.

S. Cho and L. Jin, "Managing Distributed, Shared L2 Caches Through OS-Level Page Allocation," in *Proc. MICRO*. Washington, DC, USA: IEEE Computer Society, 2006, pp. 455-468.

D. K. Tam, R. Azimi, L. B. Soares, and M. Stumm, "RapidMRC: Approximating L2 Miss Rate Curves on Commodity Systems for Online Optimizations," in *Proc. ASPLOS*. New York, NY, USA: ACM, 2009, pp. 121-132.

L. Soares, D. Tam, and M. Stumm, "Reducing the Harmful Effects of Last-Level Cache Polluters with an OS-Level, Software-only Pollute Buffer," in *Proc. MICRO*, Nov. 2008, pp. 258-269.

D. Chiou, P. Jain, L. Rudolph, and S. Devadas, "Application-specific Memory Management for Embedded Systems Using Software-controlled Caches," in *Proc. DAC*. New York, NY, USA: ACM, 2000, pp. 416-419.

M. K. Qureshi and Y. N. Patt, "Utility-Based Cache Partitioning: A Low-Overhead, High-Performance, Runtime Mechanism to Partition Shared Caches," in *Proc. MICRO*. Washington, DC, USA: IEEE Computer Society, 2006, pp. 423-432.

S. Zhuravlev, S. Blagodurov, and A. Fedorova, "Addressing Shared Resource Contention in Multicore Processors via Scheduling," in *Proc. ASPLOS*. New York, NY, USA: ACM, 2010, pp. 129-142.

A. Herdrich, E. Verplanke, P. Autee, R. Illikkal, C. Gianos, R. Singhal, and R. Iyer, "Cache QoS: From Concept to Reality in the Intel Xeon Processor E5-2600 v3 Product Family," in *Proc. HPCA*. IEEE Computer Society, Mar. 2016, pp. 657-668.

H.-T. Chou and D. J. DeWitt, "An Evaluation of Buffer Management Strategies for Relational Database Systems," in *Proc. VLDB*. VLDB Endowment, 1985, pp. 127-141.

S. Manegold, P. Boncz, and M. L. Kersten, "Generic Database Cost Models for Hierarchical Memory Systems," in *Proc. VLDB*. VLDB Endowment, 2002, pp. 191-202.

P. Zhou, V. Pandey, J. Sundaresan, A. Raghuraman, Y. Zhou, and S. Kumar, "Dynamic Tracking of Page Miss Ratio Curve for Memory Management," in *Proc. ASPLOS*. New York, NY, USA: ACM, 2004, pp. 177-188.

K. T. Nguyen, "Introduction to Cache Allocation Technology in the Intel® Xeon® Processor E5 v4 Family," Intel Corporation, Feb. 11, 2016, 7 pages.

I. Cutress, "Analyzing Falkor's Microarchitecture: A Deep Dive into Qualcomm's Centriq 2400 for Windows Server and Linux," Aug. 20, 2017, pp. 1-12.

Halwe, P.D. et al., "Towards a Better Cache Utilization Using Controlled Cache Partitioning," 2013 IEEE 11th Int'l Conf. on Dependable, Autonomic and Secure Computing, Dec. 21, 2013, pp. 179-186.

Extended European Search Report, dated Aug. 13, 2019, for European Patent Appl. No. 19166473.9, 11 pages.

* cited by examiner

```
-- Query 1:  Column Scan
SELECT COUNT(*) FROM A WHERE A.X > ?;
-- Query 2:  Aggregation with Grouping
SELECT MAX(B.V), B.G FROM B GROUP BY B.G;
-- Query 3:  Foreign Key Join
SELECT COUNT(*) FROM R, S WHERE R.P = S.F;
```

FIG. 12

```
-- Schema for Query 1
CREATE COLUMN TABLE A(X INT);
-- Schema for Query 2
CREATE COLUMN TABLE B(V INT, G INT);
-- Schema for Query 3
CREATE COLUMN TABLE R(P INT, PRIMARY KEY (P));
CREATE COLUMN TABLE S(F INT);
```

FIG. 13

CACHE PARTITIONING TO ACCELERATE CONCURRENT WORKLOADS

BACKGROUND

Hardware advances have given rise to modern in-memory database management systems (DBMS). By keeping data in main memory, these systems are no longer constrained by traditional bottlenecks such as disk I/O. Instead, memory bandwidth and access latency have emerged as new performance bottlenecks.

With all data in memory, this class of DBMS is also referred to as Operational Analytics Data Management Systems, allowing applications and users to execute both transactional and analytical workloads concurrently on the same data set. As a result, concurrent queries usually have different resource requirements depending on the workload, the number of records accessed, as well as the data structures, indices, and algorithms being used. In particular, some workloads are highly sensitive to the available amount of CPU cache (e.g., random accesses to a small hash table), contrary to cache-insensitive operations such as a sequential scan of a large memory area.

Modern microprocessors include hierarchical caches to hide the latency of memory access and may thereby speed up data processing. However, multiple cores within a processor on a given socket typically share the same last-level cache. This often hurts performance, especially in multithreaded concurrent workloads whenever a query suffers from cache pollution caused by another query running on different cores on the same socket.

This cache pollution problem holds true for different operators in a typical in-memory DBMS: during or immediately after execution of at least one cache-insensitive query, any cache-sensitive operators typically degrade in throughput. Such performance degradation is often on the order of 50% or more—this in turn tends to yield unacceptable results. Thus, in order to ensure acceptable performance when handling concurrent analytical workloads or mixed workloads of transactional and analytical operations running concurrently on the same data sets, database implementers have needed to make other sacrifices, often leading to added cost, complexity, inefficiency, and further difficulty of implementation to work around such cache pollution, while still encountering overall performance degradation to some degree.

BRIEF DESCRIPTION OF THE DRAWINGS

The accompanying drawings are incorporated herein and form a part of the specification.

FIG. 12 is an example listing of SQL queries that may be used for benchmarks and other testing described herein, according to some embodiments.

FIG. 13 is an example listing of SQL schemas of column tables that may be used for benchmarks and other testing described herein, according to some embodiments.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for partitioning one or more cache memories, such as a last-level cache of a multi-core central processing unit (CPU), to accelerate in-memory database performance for concurrent workloads, including concurrent analytical workloads and mixed workloads.

Figure 2:
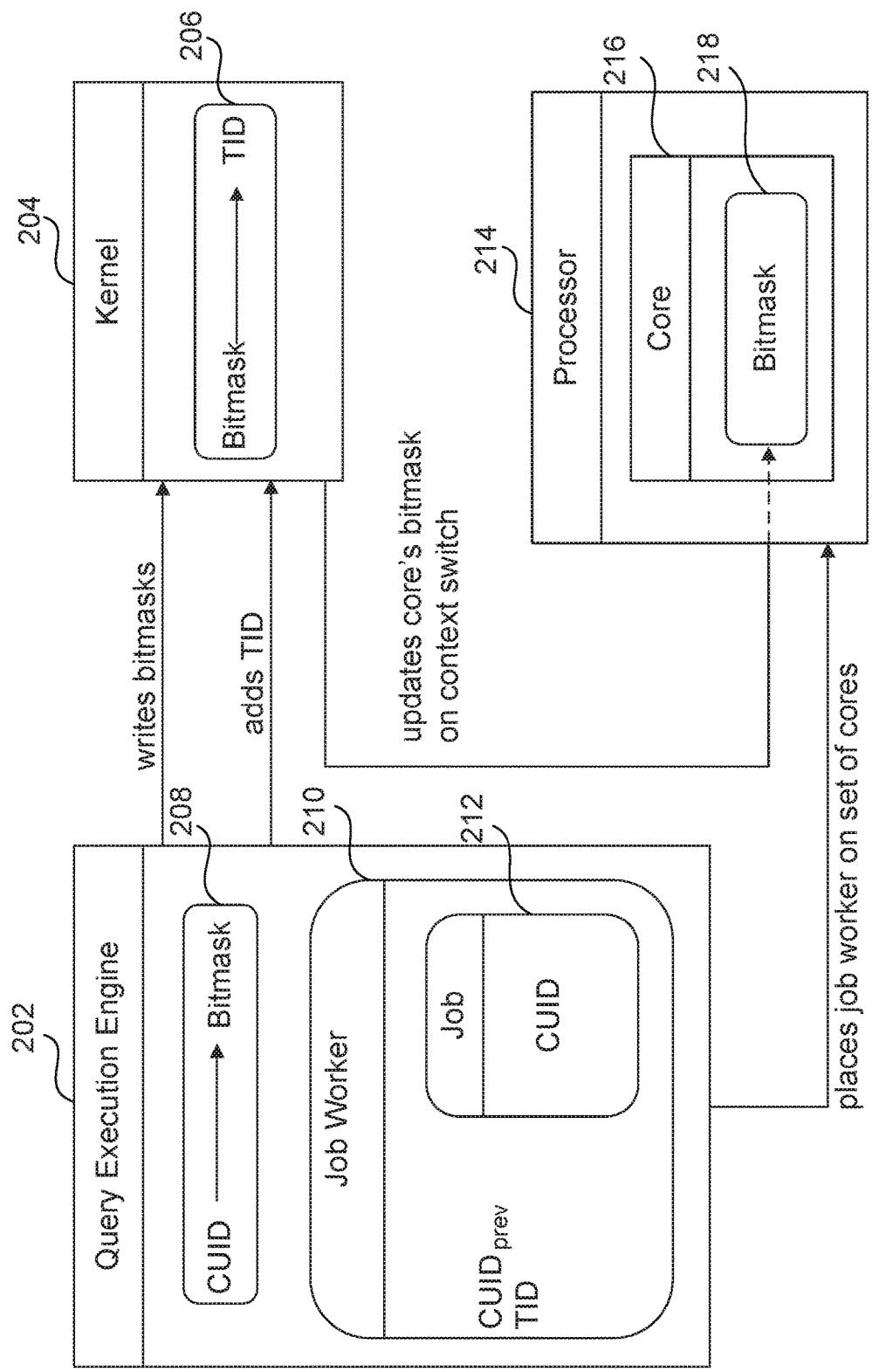
FIG. 2 is a block diagram representing a schematic overview of interaction with respect to cache partition bitmasks among a processor core, kernel, and query execution of a DBMS, according to an embodiment.

FIG. 2 is a block diagram representing a schematic overview of interaction with respect to cache partition bitmasks among a processor core, kernel, and query execution of a DBMS, according to an embodiment.

Figure 1:
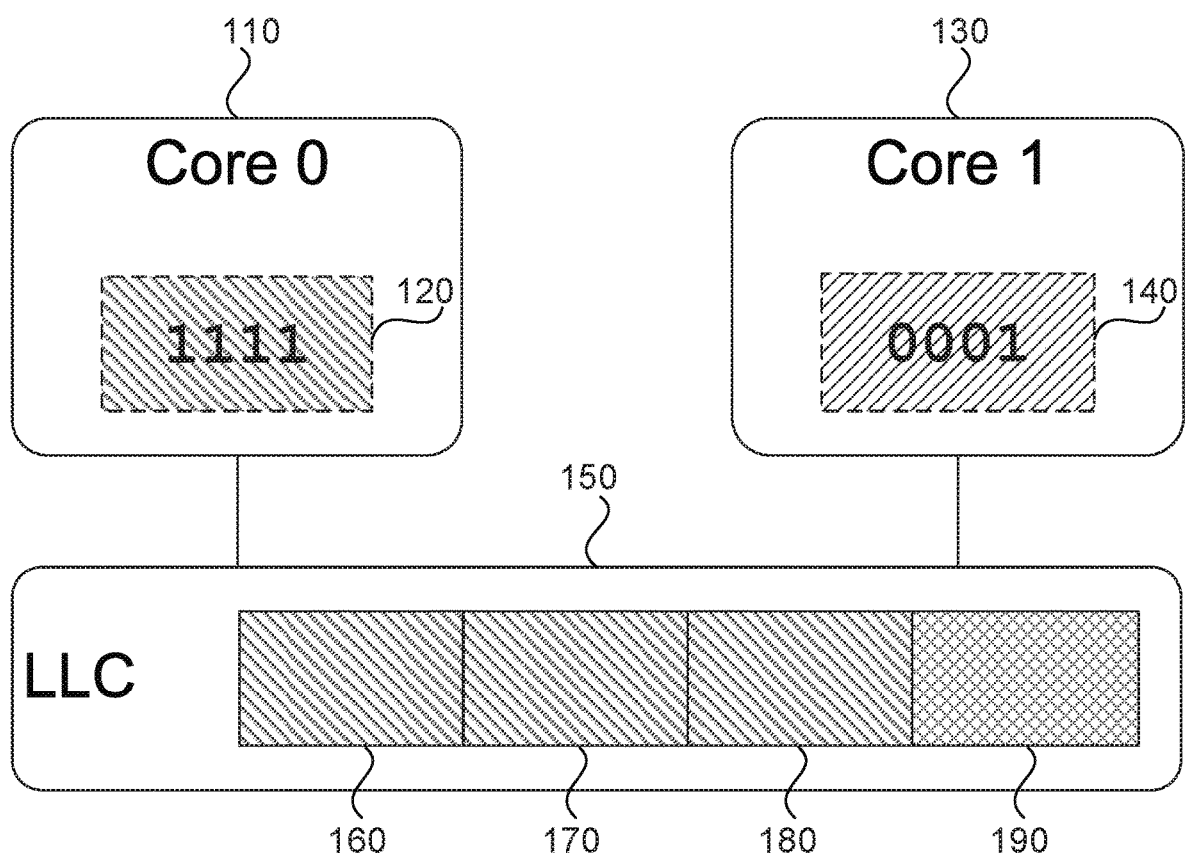
FIG. 1 is a block diagram depicting a non-limiting example of a cache partitioning scheme according to example enhanced cache partitioning techniques disclosed herein, according to an embodiment.

According to some embodiments, for example, depending on microarchitecture, it may be possible to partition the last-level cache of a processor (see FIGS. 3A-3C for example), thereby allowing more control over the CPU cache to a higher level of software, such as for programmers, system implementers, system administrators, users, etc. Such a hardware feature may be referred to generally as a quality of service (QoS) feature for multi-core processors with shared cache. Some processors may refer to a specific instance of such a feature as Cache Allocation Technology (CAT), in some non-limiting example implementations, but other comparable technology may be used for QoS with shared cache. Such technology may allow dynamic control over which portion of the last-level cache an individual core (physical or logical/virtual) may be able to evict a cache line, such as in order to replace it with a new one. For example, FIG. 1 illustrates such features.

Here, in FIG. 2, a kernel interface is shown supporting QoS technology such as CAT to integrate cache partitioning into a query execution engine 202 of a DBMS. Using a kernel interface, such as that shown in FIG. 2, according to some embodiments, may have distinct advantages over implementing a DBMS and/or execution engine directly using a raw hardware interface. For example, a raw hardware interface may require pinning threads or processes to cores with specific bitmasks or to track which thread is running on which core and to manually update a core's bitmask upon thread migration, for example. This may limit flexibility, especially for changing workloads.

Processor 214 may be a multi-core processor, and may function similarly to processor 1504 in FIG. 15, as described below. Core 216 depicts one of a plurality of cores in a multi-core processor, as processor 214 may be implemented in some embodiments. Bitmask 218 depicts a bitmask stored per core 216. Thus, in some embodiments, processor 214 and/or core 216 may be specially configured to store bitmask 218, for example. The ability of processor 214 and/or core 216 to store bitmasks in this manner may be enabled or disabled via a pin, flag, switch, hardware interface, kernel interface, or other comparable interface for controlling processor features.

The execution engine of the DBMS may use a thread pool of worker threads such as job worker 210 to execute at least one job 212, for example. A job may encapsulate a single operator or, together in a group of jobs, a parallelized operator. In some embodiments, multiple operators may be compiled into a single chunk of code that may be run as one job, for example. Cache partitioning for jobs may be implemented to enable cache optimizations per operator, according to some embodiments-similar to existing non-uniform memory access (NUMA) optimizations. Depending on processor and memory architecture, there may or may not be other NUMA effects.

A job may be labeled with information of its cache usage by associating it with a cache usage identifier (CUID). For purposes of evaluation of certain performance metrics and for certain heuristics, it may be possible to categorize jobs exclusively into one of three types: (i) jobs that are not cache-sensitive and pollute the cache (e.g., column scan); (ii) jobs that are cache-sensitive and profit from the entire cache (e.g., aggregation with grouping); and (iii) jobs that may be both cache-polluting and cache-sensitive depending on the query or data (e.g., foreign key join). By default, at least for heuristic purposes, a job may be considered by default to be categorized as (ii)—this default category may have the effect of avoiding regressions.

Figure 9A:
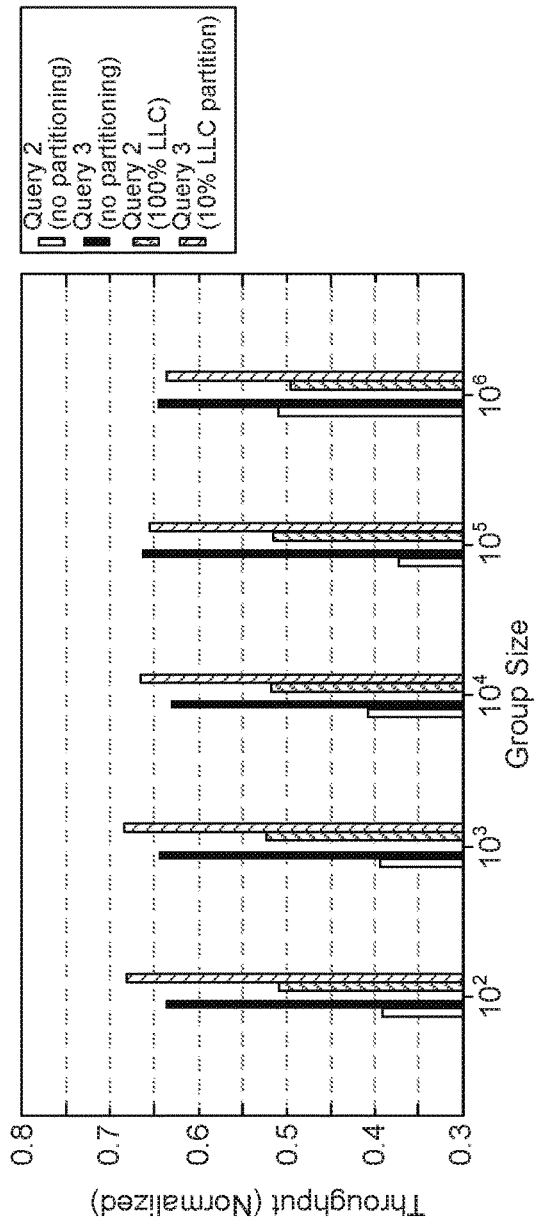
FIGS. 9A-9B are example graphs illustrating effects of enhanced cache partitioning techniques described herein as applied to certain analytical workloads that include at least foreign key join and aggregation with grouping, according to some embodiments.
Figure 9B:
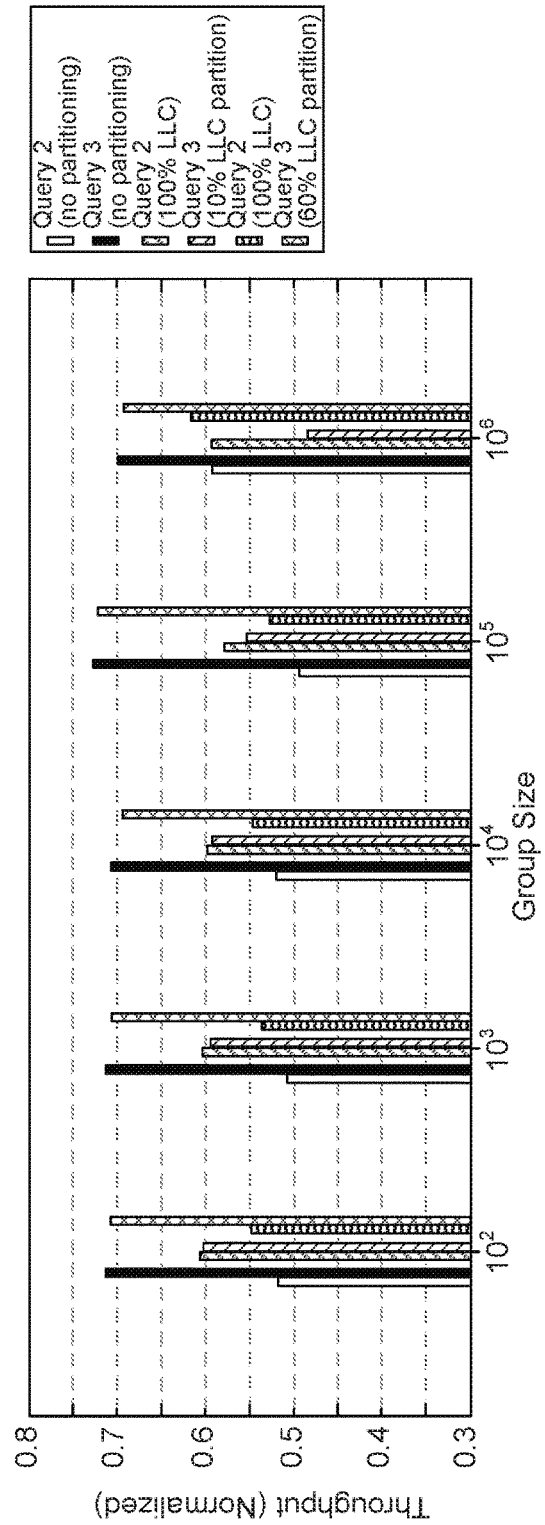

The execution engine may map the CUID to a bitmask (shown with respect to 208, for example), following the heuristics (described in more detail below with respect to FIG. 9B, for example). In some embodiments, per certain heuristics, bitmask values such as 0x00003 may be assigned for category (i); 0xfffff may be assigned for category (ii); and one of 0x00003 or 0x00fff may be assigned for category (iii), for example. Query execution engine 202 may then pass the bitmask to kernel 204.

Interacting with the kernel to associate a thread with a new cache-allocation bitmask may incur an execution time overhead. Therefore, some embodiments may compare old and new bitmasks and only associate a thread with a new bitmask if determined to be necessary, such as if the new bitmask may pass a cost-benefit analysis with respect to the execution time overhead. In practice, for some embodiments, however, overhead may be negligible, at least in comparison to many OLAP scenarios. On the test system described herein, such overhead measured less than 100 µs.

In kernel 204, bitmask may be associated with a given thread by a thread identifier (TID) (represented by 206). In practice, according to some embodiments, threads or processes may be associated, with a process being represented by a process identifier (PID), for example. Threads and/or processes may be associated with a bitmask in kernel 204, in query execution engine 202 or DBMS, or directly in processor 214 or core 216. A dedicated thread pool may have access to all cache at all times, which may avoid performance penalties that relatively short-running OLTP queries may incur as a result of kernel interaction, which may pose a relatively high overhead with respect to a typical OLTP query, for example.

Regarding the layout of the cache, the last level of cache may need to be consistently defined. Although this last cache level may vary considerably depending on architecture of processor and memory, one general definition, according to some embodiments, may be a level of a hierarchical cache that is shared among processor cores on a same socket, below a level of other caches, which may or may not be shared among cores. Various implementations of random access memory (RAM) may be considered to be a level of cache, especially if separate from and faster than main memory in a computer system.

Figure 3A:
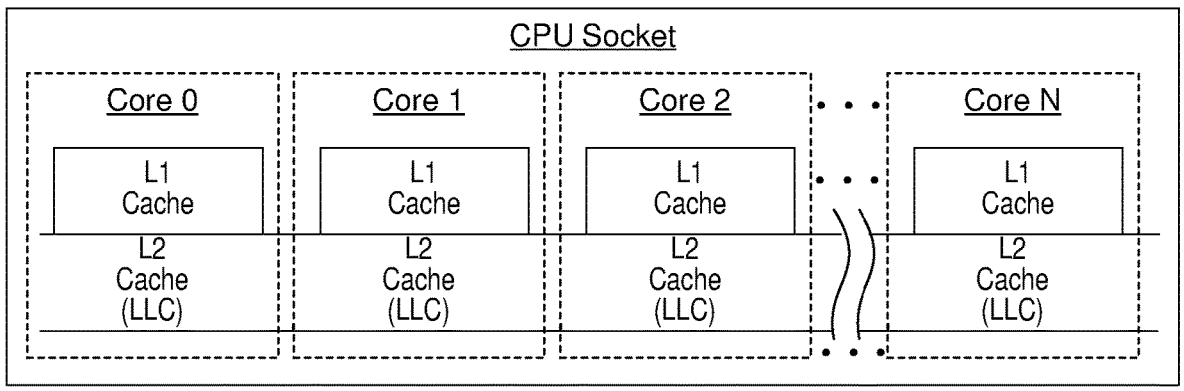
FIGS. 3A-3C are block diagrams illustrating some concepts for example cache hierarchies having different numbers of levels, according to some embodiments.
Figure 3B:
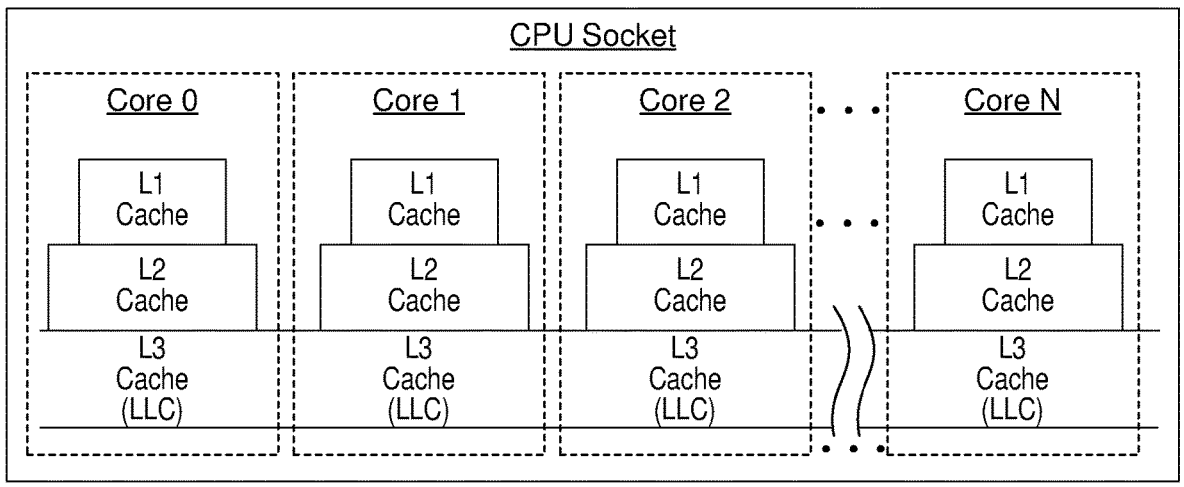
Figure 3C:
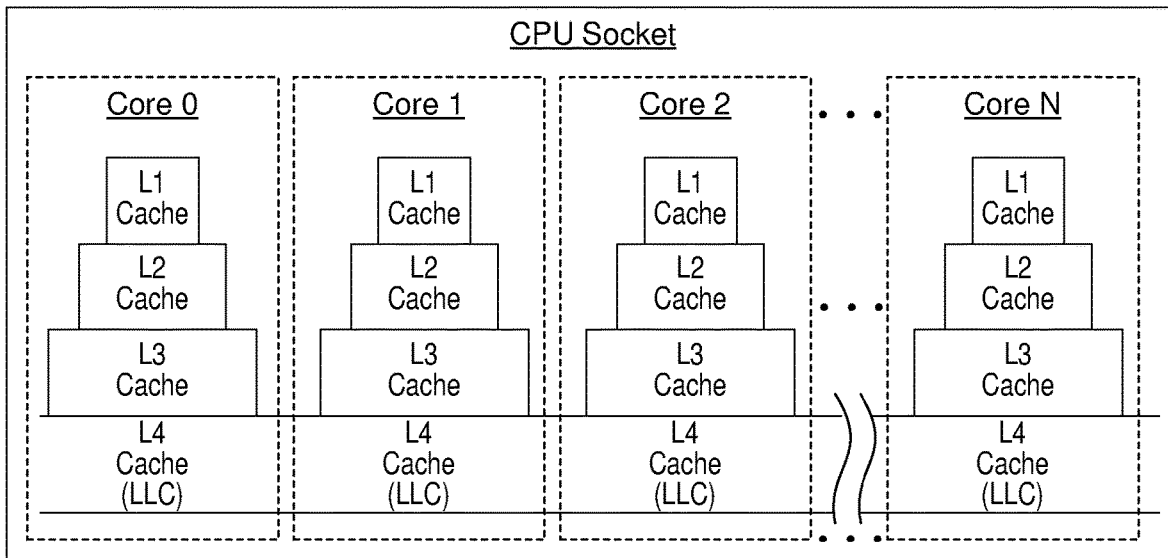

FIGS. 3A-3C are block diagrams illustrating some of these concepts for cache hierarchies having different numbers of levels, according to an embodiment. For example, FIG. 3A is sufficient to define L2 cache as a last-level cache (LLC). L1 cache, in this example, is separate and distinct with respect to each core, but L2 cache is shared, and there is no lower level of cache.

FIG. 3B depicts a versatile configuration, in which L1 cache and L2 cache are specific to each core, and L1 cache may be smaller and faster than L2 cache. In some other embodiments, L2 cache may be shared, but smaller and likely faster than L3 cache. L3 cache may be the first level of cache that is shared, and may be the last-level cache (LLC). Although this configuration may be common in some examples, it is by no means limiting.

FIG. 3C shows another example of LLC as L4 cache. As described above, L4 cache may be a layer of fast RAM, according to some embodiments. Additionally, while FIG. 3C shows L1, L2, and L3 cache each being specific to each core, it is also possible that any other layer of cache may be shared, going up the hierarchy.

The cache partitioning techniques disclosed herein were tested with analysis of cache usage on actual in-memory database management systems. By way of non-limiting examples, some further implementation details of these test systems are additionally described herein. Specifically, some non-limiting examples of algorithms, along with non-limiting examples of data structures employed by such algorithms, are presented and analyzed herein with respect to cache usage.

Figure 4:
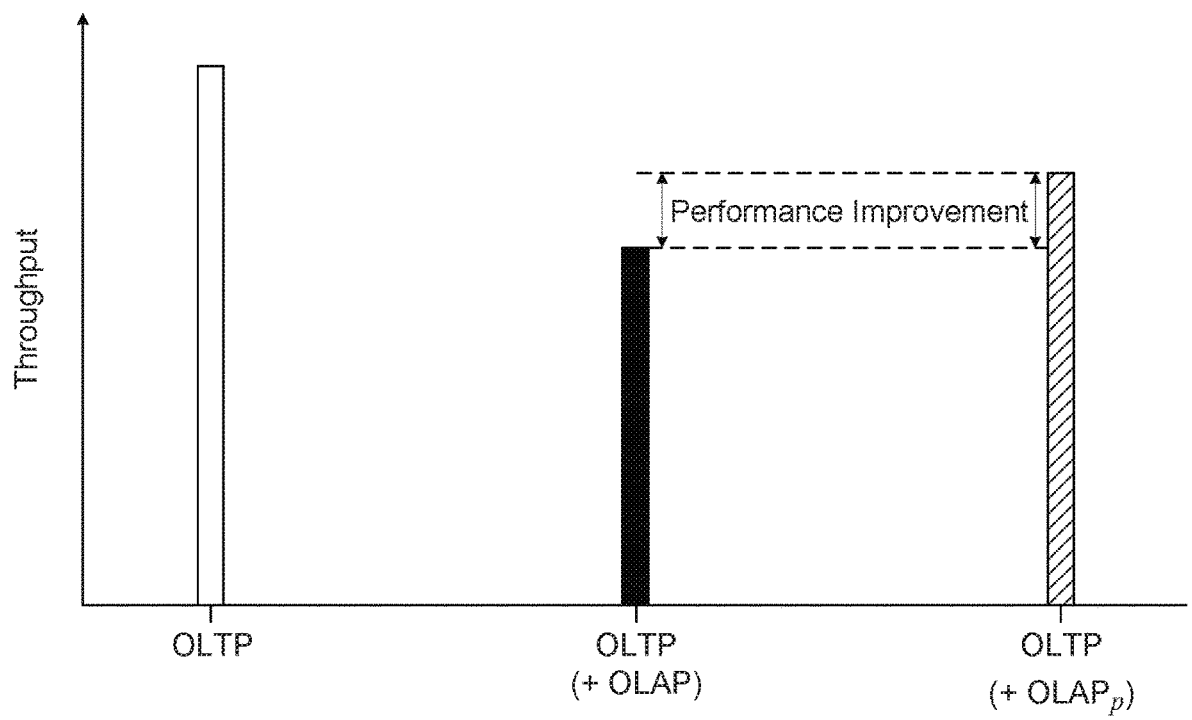
FIG. 4 is a bar graph of throughput for different types of queries on an example in-memory database management system (DBMS), according to an embodiment.

FIG. 4 is a bar graph of throughput for different types of queries on a given in-memory database management system (DBMS), according to an embodiment. Of the three bars depicted in the bar graph, the leftmost bar shows throughput of a transactional workload including at least one transactional query, e.g., using online transactional processing (OLTP), running in isolation, i.e., without concurrently running any analytical workloads, in an in-memory DBMS.

The middle bar represents throughput of the same transactional workload in the same DBMS when running at least one analytical query, e.g., using online analytical processing (OLAP), as an analytical workload concurrently with a transactional workload such as the transactional workload discussed above, thus resulting in hybrid transactional/analytical processing (HTAP). This throughput may be significantly less than that of the same DBMS running a transactional workload in isolation from any analytical processing.

In this non-limiting example, throughput of an OLTP query may degrade significantly when executed concurrently with an OLAP query, because they may compete for shared resources such as the processor's last-level cache (LLC). Thus, the OLAP query in this example pollutes the cache by frequently accessing data from DRAM. As a result of this cache pollution, cached data needed by the OLTP query may be thereby data evicted from cache, creating inefficiency that may ultimately result in noticeable degradation of throughput and overall performance.

By way of introduction to the cache partitioning disclosed herein to accelerate concurrent workloads in in-memory DBMS, the rightmost bar illustrates an improvement in OLTP workload throughput on the same DBMS for the same concurrent mixed workload of transactional and analytical (OLTP and OLAP) queries as with the middle bar. The only difference between the middle bar and the rightmost bar is that the DBMS whose throughput is reflected in the rightmost bar is implemented on a system that leverages enhanced techniques disclosed herein, including cache partitioning to accelerate concurrent mixed workloads. The rightmost bar indicates that enhanced techniques, including restricting how much of the LLC is available to certain OLAP operations, may avoid cache pollution, which may translate into a real increase in throughput of concurrent OLTP operations in mixed workloads and noticeably improved performance of the DBMS.

The bar graph of FIG. 4 is for purely illustrative purposes, showing empirical data from one non-limiting example of one particular mixed workload for testing. Other embodiments, other test workloads, and/or other DBMS implementations may yield different results with different degrees of performance enhancement. However, example implementations of the cache partitioning techniques described herein have empirically yielded improved performance, in various benchmarks and real-world test cases. Some results of these experiments are further detailed via additional examples that follow below. These improvements may be achieved without introducing regressions, and the cache partitioning techniques described herein may be implemented at low cost.

FIG. 4 further represents an example of realistic desired results in the way of overall throughput for mixed workload operation of DBMS, such as HTAP applications, etc. On the same single hardware platform, OLTP operations generally will not be slower than even fast OLAP operations, in some embodiments. However, leveraging enhanced cache partitioning techniques disclosed herein, it may be possible to close the gap between OLTP and OLAP to some extent, increasing OLAP performance specifically while not sacrificing OLTP performance. In some cases, OLTP operations may also improve without slowing down OLAP operations. Even in scenarios where performance improvements may not be uniformly realized across all operations or workloads, the experimental data shown below further demonstrate that the enhanced cache partitioning techniques disclosed herein may improve overall throughput and system performance with mixed workloads.

For example, in some embodiments, data structures for an in-memory DBMS may be custom-designed, tuned (manually or automatically), and/or otherwise configured to be used in a manner suitable for the specific cache hierarchy and cache sizes of any given target hardware platform. Such data structures may include, but are not limited to, any of dictionaries, hash tables, and/or bit vectors, for example.

Dictionaries may be used to aid in compression of columnar data in an in-memory DBMS, in some embodiments. In this regard, such dictionaries may also therefore have the effect of accelerating value comparisons, for example. Hash tables may independently be used for aggregation with grouping in an efficient manner. In similar fashion, such hash tables may also be tuned to the specifications of a given cache architecture on a target hardware platform. Bit vectors may be used to accelerate processing of foreign key joins.

By way of testing on at least these types of data structures and operations, empirical data have shown real performance gains from the enhanced techniques described herein with respect to some real-world use cases. Although these data structures and operations may be used throughout query processing engines for in-memory DBMS, not just for the types of queries shown herein, persons of ordinary skill in the art may appreciate that other data structures and operations of in-memory DBMS query processing engines may be tuned and improved in similar ways using the techniques described herein.

Dictionaries, for example, may affect performance of query execution of some in-memory DBMS, in some embodiments. An ordered dictionary may map domain values to a dense set of consecutive numbers. Thus, in some embodiments, rather than storing actual value in the columns of a table, a storage engine of some in-memory DBMS may instead store a smaller number referencing an entry in the dictionary. This may, in many cases, result in considerably improved size (smaller footprint in memory) and result in improved performance and overall capacity for additional data and fast processing thereof.

In addition, using dictionaries, each column may be further compressed using different compression methods. If data needs to be decompressed during query processing, for example, for data projections or for construction of intermediate result(s), a corresponding dictionary then may be accessed frequently to look up the actual value, depending on actual data sets and processing requirements.

As another example, hash tables are data structures that may be involved in cache-sensitive operations. By nature, hash tables may be accessed in a random-access fashion, which may in turn be very expensive, such as when the hash table does not entirely fit into a CPU cache when it is to be used. In some embodiments, individual algorithms, such as grouped aggregation, may use hash tables, for example, to store temporary results for different groups. They may be used both locally per worker thread and globally to merge thread-local results, in some non-limiting examples. Accesses to hash tables may be relatively frequent during query processing.

Bit vectors may accelerate evaluation of, for example, foreign key joins in some OLAP-oriented join algorithms of query execution engines in some in-memory DBMS, according to some embodiments. Bit vectors may map a primary key range to a compact representation, which may be of suitable size to be kept in CPU caches even for a large key range. Using bit vectors may reduce memory loads and CPU cost, because the CPU may perform the same operation on multiple elements of a bit vector at the same time.

For some hardware platforms and DBMS platforms, it may be necessary or desirable first to determine how much last-level cache a DBMS may need in order to achieve a desired level of performance for certain algorithms and data structures. Such determinations may be carried out, for example, using certain benchmarks and/or micro-benchmarks. Such benchmarking may illustrate the extent to which the enhanced techniques disclosed herein may improve DBMS performance and how performance could be further improved by specific cache partitioning schemes. However, performance benefits may still be achieved by using the enhanced techniques disclosed herein without necessarily performing any such testing or benchmarking in advance.

Effects of CPU caches on end-to-end performance may be determined by running certain benchmarks expressed SQL queries, measuring full query execution times for each query. Some example queries used in these experiments are listed in FIG. 12 and listed also in Table 1 below. These queries may be deliberately chosen so that real performance of each query may be predominantly governed by a specific database operator, e.g., (1) column scan, (2) aggregation with grouping, and (3) foreign key join.

TABLE 1

| Query 1: Column Scan | SELECT COUNT(*) FROM A WHERE A.X > ?; |
| Query 2: Aggregation with Grouping | SELECT MAX(B.V), B.G FROM B GROUP BY B.G; |
| Query 3: Foreign Key Join | SELECT COUNT(*) FROM R, S WHERE R.P = S.F; |

In a non-limiting example of a test query focusing on column scan, Query 1 of Table 1 may be run to analyze the performance of the column scan operator. The parameter '?' may be used to vary the selectivity of the predicate. The operator may sequentially read an entire column of a table while evaluating a range predicate. The operator may work on compressed data and may use single-instruction, multiple-data (SIMD) instructions, for example, to process multiple encoded values at once, which may independently improve performance in addition.

Column scan may be run independently of any auxiliary data structures, such as dictionaries, hash tables, bit vectors, etc., and may read data from memory only once. According to some embodiments, the column scan may exploit data locality by processing each byte of a cache line. Thus, column scan may profit from a hardware prefetching, for example, such as where a CPU may load data of cache lines into cache before that data may be requested.

In a non-limiting example of a test query focusing on aggregation with grouping, Query 2 of Table 1 may be run to analyze the performance of the grouping operator. According to some embodiments, the operator may proceed by distributing its input among a set of worker threads. Each worker thread may collect aggregates locally on a per-partition basis, for example. After all threads have finished aggregating, the algorithm may then merge local results to build a global result for the next operator of the query plan.

In some embodiments, the aggregation-with-grouping operator may decompress the input data to compute the aggregate. As a result, the operator may perform many random accesses to a dictionary. Furthermore, the algorithm may use hash tables to store intermediate, pre-aggregated results for groups. Hash tables may also be used to store the merged results globally. Accessing hash tables for these purposes may result in additional random accesses to memory, which may in turn benefit from an appropriate amount of caching.

In a non-limiting example of a test query focusing on foreign key joins, Query 3 of Table 1 may be run to analyze the performance of the foreign key join operator. The join operator may be targeted specifically for OLAP workloads and may exploit the fact that a foreign key must map to exactly one primary key.

According to some embodiments, a join algorithm may create a compact representation of primary keys by mapping the primary keys to a bit vector. Thus, iterating for a range of primary keys i from 1 to N, the algorithm may create a bit vector of length N and may set the i-th bit of the bit vector if the query's predicate evaluates to true for the row of primary key i. In many use cases, the resulting bit vector may fit in the CPU caches, even for a large number of keys. Once the bit vector has been generated, the algorithm may then perform a look-up in the bit vector for each foreign key to check whether or not it matches a primary key. In addition, according to some embodiments, the algorithm may also aggregate matches.

Regarding data sets to be used in testing, FIG. 13 and Table 2 illustrate example SQL schemas (schemata) of column tables that may be used in such testing or benchmarking experiments. The tables may be filled with generated data (e.g., random values for each row, without null values) and may vary the distribution of the data to study its impact on cache usage of the operators.

TABLE 2

| Schema for Query 1 | CREATE COLUMN TABLE A (X INT); |
| Schema for Query 2 | CREATE COLUMN TABLE B (V INT, G INT); |
| Schema for Query 3 | CREATE COLUMN TABLE R (P INT, PRIMARY KEY (P)); CREATE COLUMN TABLE S (F INT); |

According to a non-limiting example, used here for purely illustrative purposes, the input data of Query 1 may be a table that includes one column (X) having one billion, i.e., $10^9$, integer values. These values may be randomly generated integers, ranging between 1 and 1 million, i.e., $10^6$, randomly generated with a uniform distribution, according to this non-limiting example test. While the integer types may initially have a size of 32 bits, compression may be applied to store each integer using 20 bits (i.e., $[\log_2(10^6)]$ bits) on average, for example. To vary the selectivity of the predicate, the parameter ('?' from Query 1) may be a random integer selected as any integer value between 1 and $10^6$, varied after every execution of the query.

According to another non-limiting example, used here for purely illustrative purposes, the input data of Query 2 may be a table that includes two columns each having one billion, i.e., $10^9$, integer values. These values may be randomly generated integers, ranging between 1 and 1 million, as with column X above. In this example, the first column V may be used for aggregating while the second column G may be used for grouping. The number of distinct values in each column may be randomly varied, independently of the total number of values in each column.

For example, in some embodiments, the number of distinct values in column V may be randomly varied between 1 million and 100 million (i.e., between $10^6$ and $10^8$). The size of a corresponding dictionary may depend on the number of distinct values in column V, in this non-limiting example. Similarly, the number of distinct values in column G may be randomly varied between 100 and 1 million (i.e., between $10^2$ and $10^6$). The number of groups may then depend on the number of distinct values in column G, in this non-limiting example. Accordingly, the size of column G may also then impact the size of the hash tables used by the algorithm in an aggregation with grouping, in some embodiments.

According to another non-limiting example, used here for purely illustrative purposes, the input data of Query 3 may be two tables that include one column for each table. In the first table, column P may include distinct integers, forming a primary key. Each distinct integer in column P, for purposes of this non-limiting example, may be randomly selected from a range of 1 to N, in which N may randomly be varied from one million to one billion (i.e., $10^6$ to $10^9$). In the second table, column F may contain $10^9$ integers referencing the primary key (column P) of the first table, in some embodiments. For purposes of this example test, the foreign keys of column F may be generated by randomly selecting primary key values from column P, according to some embodiments.

The enhanced techniques described herein may be implemented in any computer system that supports cache partitioning. As one non-limiting example, tests benefiting from the enhanced cache partitioning techniques disclosed herein have been run on a system running Linux kernel version 4.10 on a single socket using a 22-core processor with simultaneous multithreading enabled, allowing this processor to execute up to 44 threads in parallel. In the processor of this example, the L3 cache is shared among cores and is the last-level cache (LLC) that implements an inclusive policy (ensuring that LLC contains all entries of higher-level caches), although any kernel, operating system, and multi-core processor may be appropriately configured, in other embodiments. The system of this non-limiting example, for added context, uses 128 GiB of dynamic random-access memory (DRAM) as system memory, having a real bandwidth of 64 GB/s and an access latency of 80 ns.

However, beyond just this non-limiting example, the enhanced techniques described herein may be implemented with any application, on any operating system running any kernel and processor combination that may be configured to enforce cache partitioning schemes, with any number of cores, threads, or processes, and with any amount, speed, and type of system memory or cache, with any number of layers in the cache hierarchy, and implementing any cache inclusion policy. In some embodiments, these cache partitioning schemes may be enforced on a per-thread, per-process, per-core, or per-socket basis, to name a few non-limiting examples.

In order to determine effects of reduced cache size on performance of DBMS operation, measurements may be taken on independently repeated operations using the same database operations using gradually reduced cache sizes. In some embodiments, cache size may be reduced by hardware partitioning schemes supported in hardware and/or software, independently or in combination, for example. In some embodiments, such partitioning may be applied only to LLC, although other effects may be realized by modifications to any layer of shared cache, for example. Thus, an in-memory DBMS may be intentionally restricted so that it may only allocate data in a limited amount of the LLC, such as a partition, for example.

For purposes of the example tests shown herein, SQL queries may be executed to measure end-to-end response time, defined here as total execution time including parsing, query execution, and result transfer. There may also be a concurrency limit enforced, so that the number of simultaneously executing worker threads of SQL queries executed does not exceed the number of physical cores of the system. Thus, for such tests, it may be possible for queries to be executed on all available cores of the processor, ensuring a high degree of parallelization with a single SQL query. Different concurrency limits may result in lower degrees of parallelization and may yield different performance improvements.

As a point of reference for testing, a query's throughput (with any given limitation on the size of available LLC) may be benchmarked against the greatest throughput of the same query when using the entire cache, including all LLC without restriction. In some embodiments, as additional reference points, cache hit ratio of the LLC and/or cache misses per instruction of the LLC may also be measured.

Figure 5:
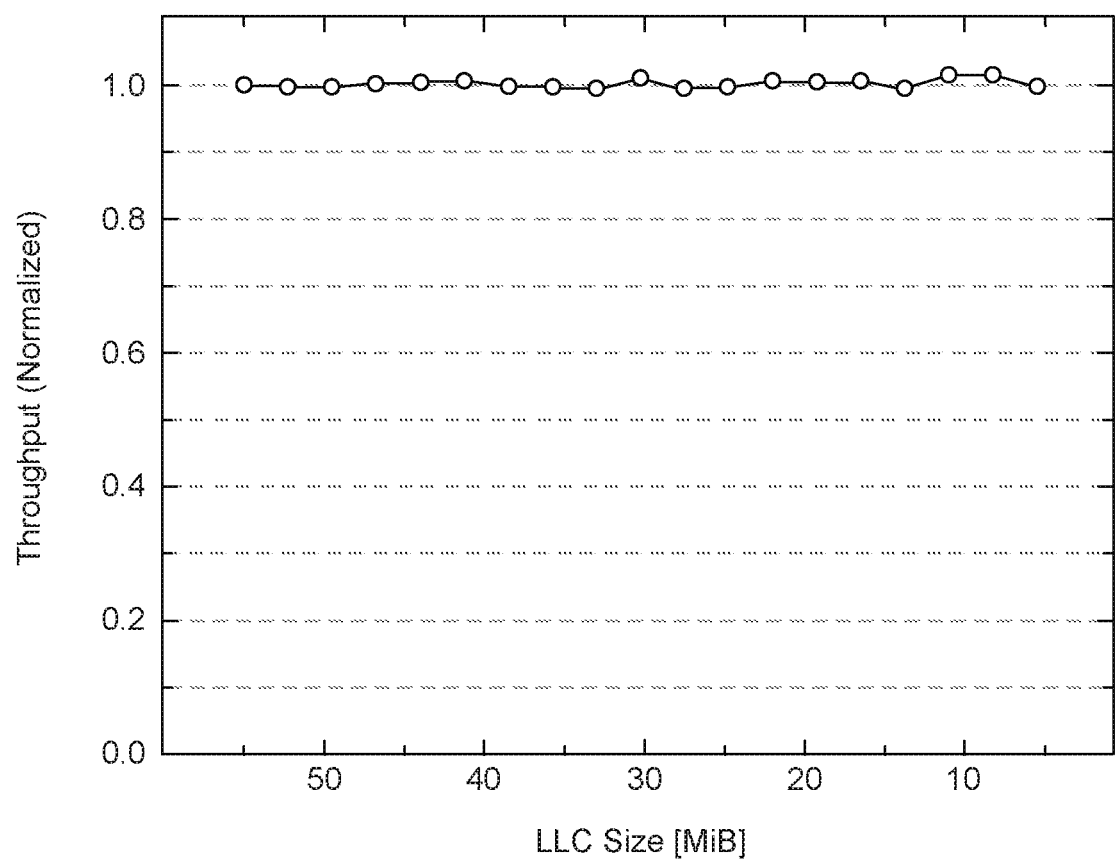
FIG. 5 is a graph illustrating empirical data of experiments run on an example of a column scan query, according to an embodiment.
Figure 6A:
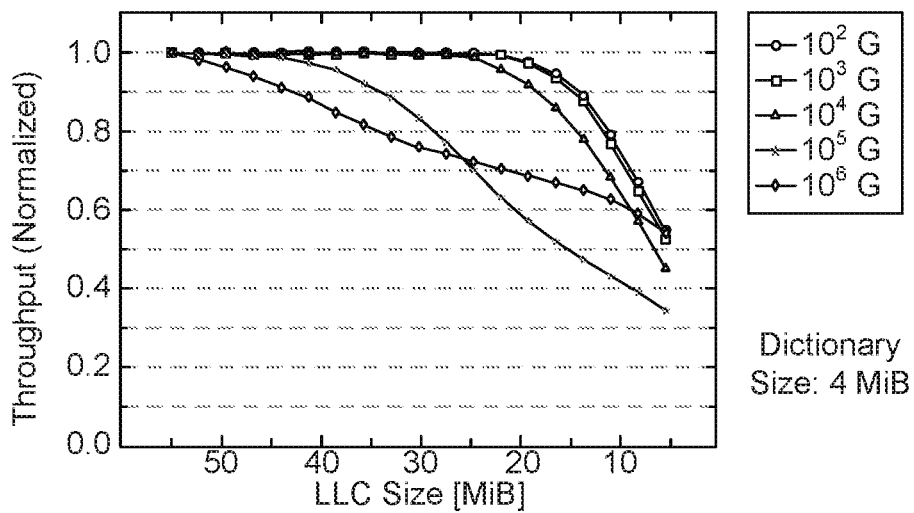
FIGS. 6A-6C are example graphs demonstrating cache sensitivity of an aggregation with grouping relative to an amount of available cache (available cache size), with dictionary size held constant while group size is varied by an order of magnitude per plot line, according to some embodiments.
Figure 6B:
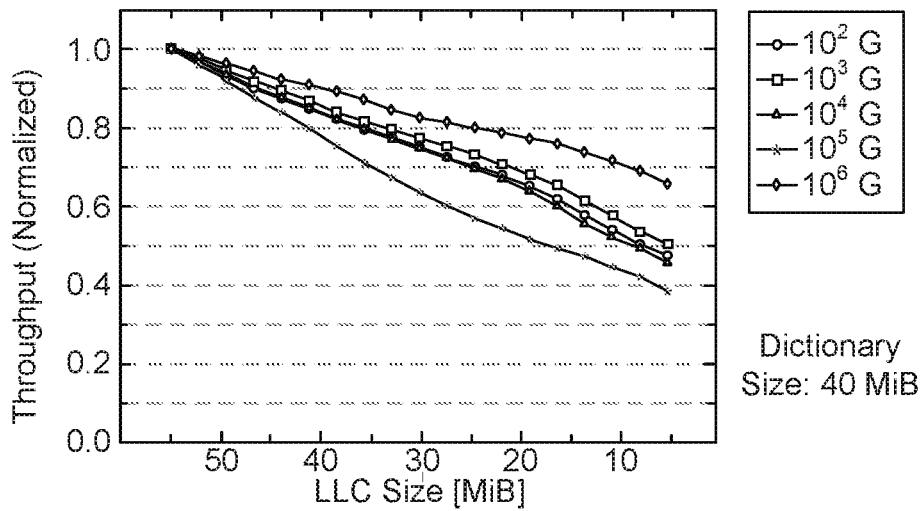
Figure 6C:
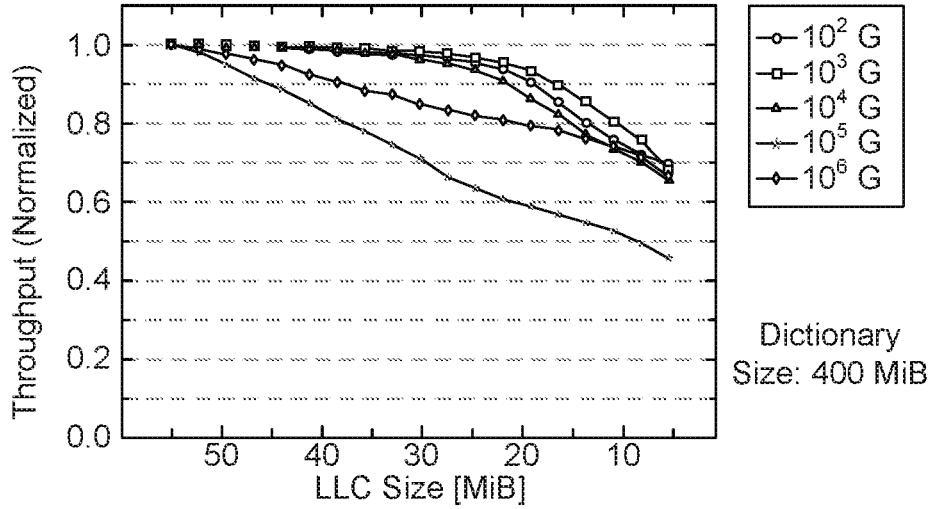
Figure 7:
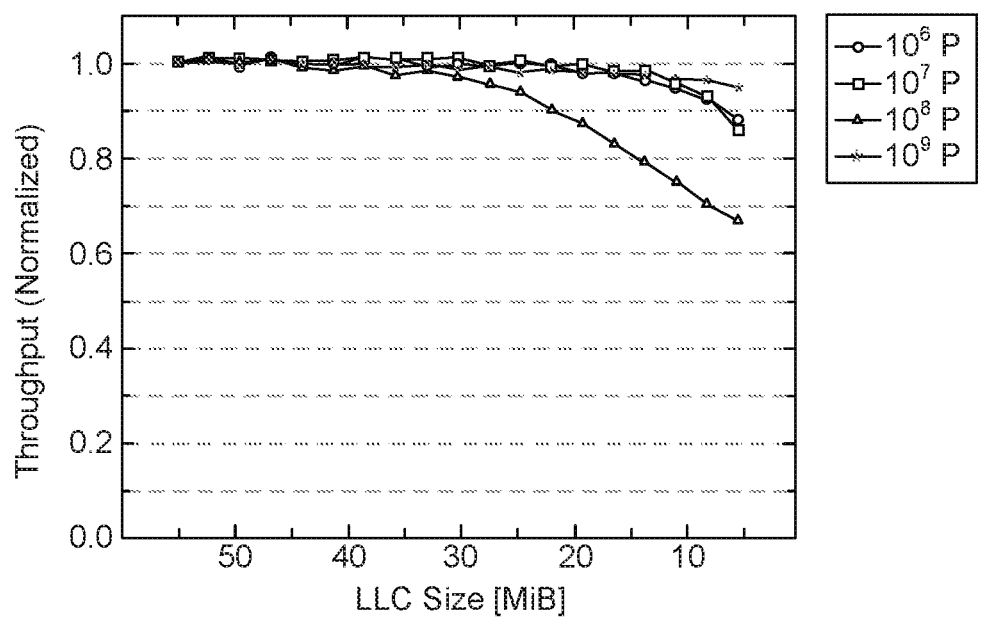
FIG. 7 is an example graph that demonstrates how foreign key join operations may or may not be cache-sensitive depending on certain parameters of the query and platform, according to an embodiment.

Regarding results of micro-benchmark testing as described above, empirical data for each of the three queries outlined in the above non-limiting examples are illustrated with respect to FIGS. 5-7 for baseline measurements using the different queries in analytical workloads as described above and/or using varied system parameters. By contrast, FIGS. 8A-11B show comparisons of systems using some of the enhanced cache partitioning techniques disclosed herein against the same systems not using the enhanced techniques, again evaluating the same analytical and mixed workloads on the same benchmark data sets and real-world data.

Experimental measurements for the examples considered here suggest that the column scan operator may not be sensitive to the size of the cache. Column scans, for example, may not benefit from a large portion of the LLC and may run approximately as well with a small cache configuration (e.g., cache limited by partitioning to 10% of available LLC). In some embodiments, this observation may be consistent with general understanding, because column scans typically read data once from main memory in an in-memory DBMS, without any data re-use.

Aggregations, by contrast, may be highly sensitive to the size of the cache, according to some embodiments. The aggregation-with-grouping operator analyzed here may be based on hashing, and may be most cache-sensitive whenever the size of the hash tables is comparable to the (configured) LLC size. If the hash table is either very small or very large by comparison to the LLC size, cache sensitivity may become less significant.

In some embodiments, a foreign key join algorithm's cache sensitivity may depend on cardinality of the primary keys: If the size of the bit vector is comparable to the size of the LLC size, the operator may become cache-sensitive. Otherwise the operator may not use the LLC, for example.

Results of such experiments may indicate that scan-intensive operators, such as the column scan operator, or the foreign key join operator (e.g., for a relatively small bit vector), may cause cache pollution for other operators that may be cache-sensitive operators, such as an aggregation-with-grouping operator, if they are executed concurrently, as in analytical workloads.

Awareness of these different cache usage characteristics may lead to effective classification of database operators based on their cache usage, and in turn, may enable use of enhanced cache partitioning to manage the shared LLC more efficiently for concurrent workloads. According to some embodiments, such experiments may show and have shown that an approach of restricting scan-intensive operators to a portion of the cache, while allowing at least one cache-sensitive operator to use the entire cache, for example, may avoid cache pollution for concurrent workloads and improve performance.

Some of the enhanced techniques described herein may leverage cache partitioning feature of modern processors, which may further be used in implementations of in-memory DBMS that may support cache partitioning in a query execution engine, for example. By integrating cache partitioning into a DBMS, it may be possible to avoid or reduce cache pollution even further and thereby improve the performance of concurrent query execution.

Previously existing hardware systems and processors have provided little control over the cache, such as to users, application software, and even system software. This is because cache may be entirely managed by hardware, for example. Techniques such as page coloring may offer the possibility of partitioning the cache by allocating memory in specific memory pages, which may map to a specific portion of the cache. However, their use in commercial systems may be limited. Page coloring may require significant changes at both the kernel and application level, which may result in diminished usability and maintainability. In addition, page coloring may be less flexible, because re-partitioning the cache dynamically at runtime may require making copies of the allocated data.

By contrast, in some embodiments, for example, depending on microarchitecture, it may be possible to partition the last-level cache of a processor (see FIGS. 3A-3C, for example), thereby allowing more control over the CPU cache to a higher level of software, such as for programmers, system implementers, system administrators, users, etc., to improve overall system performance. Such technology may include CAT, for example, and may allow dynamic control over which portion of the last-level cache an individual core (physical or logical/virtual) may be able to evict a cache line, such as in order to replace it with a new one. FIG. 1 as described above illustrates such features.

Thus, cache (LLC, in this example) may be partitioned by writing a bitmask of n bits in a specific processor register of a core, where in depends on the processor model. In some embodiments, setting the bit at the i-th position of the bitmask means that the core may evict cache lines from the i-th portion of the last-level cache, while unsetting the bit at the i-th position means that the core may not evict cache lines from the i-th portion of the cache. Bitmasks may be dynamically changed at runtime. With different bitmasks, cores may be allowed or disallowed to evict different portions of the cache exclusively, in some embodiments.

To provide a more concrete example, the 22-core processor described above typically has a 20-way associative LLC with a size of 55 MiB. The bitmask for controlling the cache partitioning feature has a size of 20 bits. As a result, one portion of the cache equals 55 MiB/20=2.75 MiB. This means that setting, e.g., two bits in the bitmask, corresponds to a portion with a size of 5.5 MiB. Note that this example processor may allow up to 16 different bitmasks to be active at the same time. However, these numbers are generally dependent on specific implementation details of each specific processor architecture, and may be different in different architectures or platforms, in some embodiments.

Kernel support for cache partitioning, which may be, in some embodiments, based at least in part on QoS technology for partitioning a shared cache, such as CAT, for example, may allow software (e.g., by a driver, file system interface, user interface, or program interface, to name a few non-limiting examples) to specify each or any core's bitmask used for cache partitioning by reading and writing to a special or virtual file system or comparable operating system-level mechanism, such as procfs, sysfs, or sysctl, to name a few non-limiting examples. Other comparable mechanisms may be used.

Furthermore, instead of specifying a bitmask only for a core, software may have the option to specify a bitmask for a process identifier (PID) or a thread identifier (TID), for example. Such mechanisms may allow mapping at least one portion(s) of the cache to an individual process or thread. During a context switch, the scheduler of the kernel may be responsible for updating the bitmask of the core on which a process or thread is currently running.

To avoid cache pollution and to improve the performance of concurrent workloads by partitioning the cache, cache may be allocated in advance to an operator or a query, respectively. For some purposes, experimental testing, benchmarking, and/or micro-benchmarking may reveal reasonable starting points, where performance may be better than in some other cache partitioning schemes or cache allocation parameters, specific to a given system configuration. FIGS. 5-7 may indicate some starting points with respect to their corresponding operators or query types, for example.

For example, with respect to Query 1 of Table 1 and FIG. 12, the experimental data of FIG. 5 demonstrate that the performance of Query 1, as a column scan in this example, does not depend on the size of available cache, because a column scan operator typically may not re-use data and may not require dictionary accesses, hash table accesses, etc. However, by continuously loading data from main memory in an in-memory DBMS, the column scan typically may have the unwanted consequence of evicting many cache lines and replacing them with data that likely may not be accessed a second time. Thus, even if the nature of column scans were not known, the empirical data show that column scans typically may cause cache pollution for co-running queries, which may adversely affect cache-sensitive operators, such as may be found in many analytical queries.

Thus, from FIG. 5, as a starting point, a cache-insensitive query such as a column scan may then be allocated a 10% LLC partition from its respective core, outside of which the core running the cache-insensitive query may be disallowed to evict cache lines, thereby avoiding cache pollution of the other 90% of the LLC, for example.

In the embodiment of the test platform above, with a 20-way n-way associative cache (here, in =20, in this non-limiting example), the bitmask value would then be 0x00003, setting a subset of the bits of the bitmask, e.g., 10% of the 20 bits (i.e., binary 0000 0000 0000 0000 0011). This, then, may allow the cache-insensitive query to evict cache lines only in the 10% of LLC corresponding to the set bits of the bitmask, according to some embodiments. The portion of the cache excluding the subset of bits of the bitmask that are set may then be a portion of the cache from which a given core, corresponding to the bitmask, is disallowed to write or evict cache lines. Depending on processor architecture, other embodiments may provide for even more granular control of cache partitioning.

Allowing just this 10% write (evict) access to the LLC, considering total bandwidth, may allow the column scan to continue without significant performance loss. In some embodiments, even cache-insensitive queries or operators may still require at least some access to writable cache, or else they may become memory starved.

For example, other tests (not shown) may be evaluated using the bitmask 0x00001 (i.e., one way, or 5%, of a 20-way associative cache) to restrict a scan-intensive (cache-insensitive) operator, such as a column scan. However, such a restrictive configuration may degrade performance severely, even for Query 1. Still, such behavior may be dependent on a particular implementation of a mechanism for cache partitioning, such as restricting access to just one way or certain ways of an n-way set associative cache, which may result in contention.

Thus, according to some embodiments, it may not be possible to bypass all cache or use the smallest atomic amount of cache capable of being allocated by the enhanced cache partitioning techniques disclosed herein, but through an implementer's understanding of certain expected behaviors of target workloads, and/or empirical data that may be gathered in advance or in real time, enhanced partitioning techniques disclosed herein may thus allow for informed decisions on cache allocation for improved performance of some cache configurations over others, for example.

Continuing to FIGS. 6A-6C, these example tests demonstrate how an aggregation with grouping may be relatively more sensitive to the amount of available cache (available cache size), because an aggregation-with-grouping operator typically may access a dictionary and/or a hash table, and frequently, for large data sets and/or large group requirements. In each of FIGS. 6A-6C, dictionary size is held constant (FIG. 6A having a constant 4 MiB dictionary, FIG. 6B having a constant 40 MiB dictionary, and FIG. 6C having a 400 MiB dictionary, in these examples), while group size is varied, each plot line corresponding to a group varied in size by an order of magnitude.

Progressing rightward along each graph, available LLC shrinks until performance degradation may be seen for each data point of variation in any of the other parameters. As shown in of FIGS. 6A-6C, where the graphs are normalized for group size at a given dictionary size, a general trend is that performance may gradually degrade as available cache size diminishes, although for some cases (past some threshold values), performance degradation may be steep. This may be interpreted to the effect that, by preserving a certain amount of cache for certain cache-sensitive operators (disallowing cache-insensitive operators to evict from that certain amount of cache), precipitous drops in performance may be averted, significantly improving overall throughput for at least some workloads.

Thus, it may make sense for performance not to place any restriction on access to the LLC for a cache-sensitive operator such as an aggregation with grouping operator. In a processor core where a bitmask may be stored, if the core may write into (evict lines from) any portion of cache for which a corresponding bit of the bitmask is set, then avoiding restrictions may therefore require all bits to be set. In the non-limiting example of a 20-bit bitmask, such a bitmask would be 0xfffff, making 100% of the shared LLC available for writing and/or eviction by the cache-sensitive process or thread running on the core having the bitmask with all bits set.

Figure 8A:
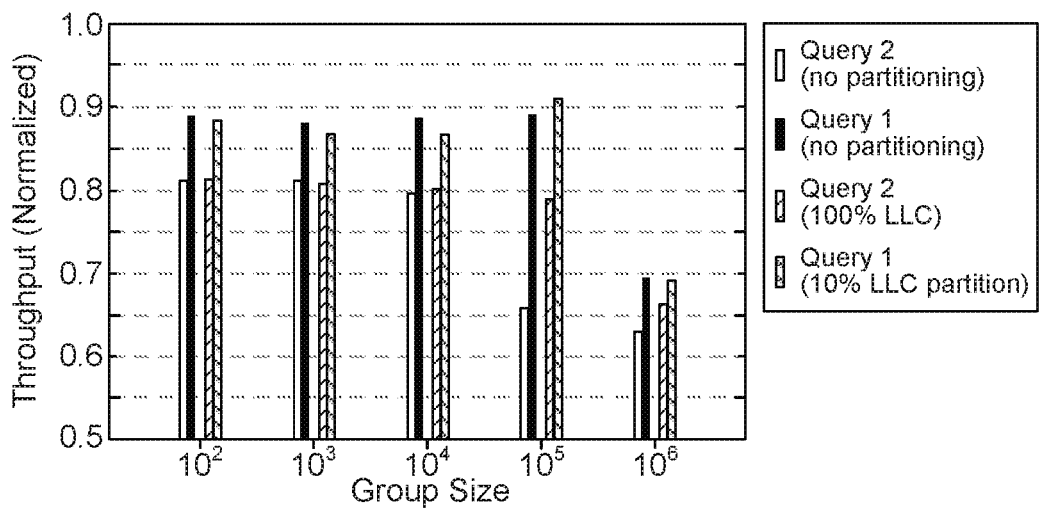
FIGS. 8A-8C are example graphs illustrating effects of enhanced cache partitioning techniques described herein as applied to certain analytical workloads that include at least column scan and aggregation with grouping, according to some embodiments.
Figure 8B:
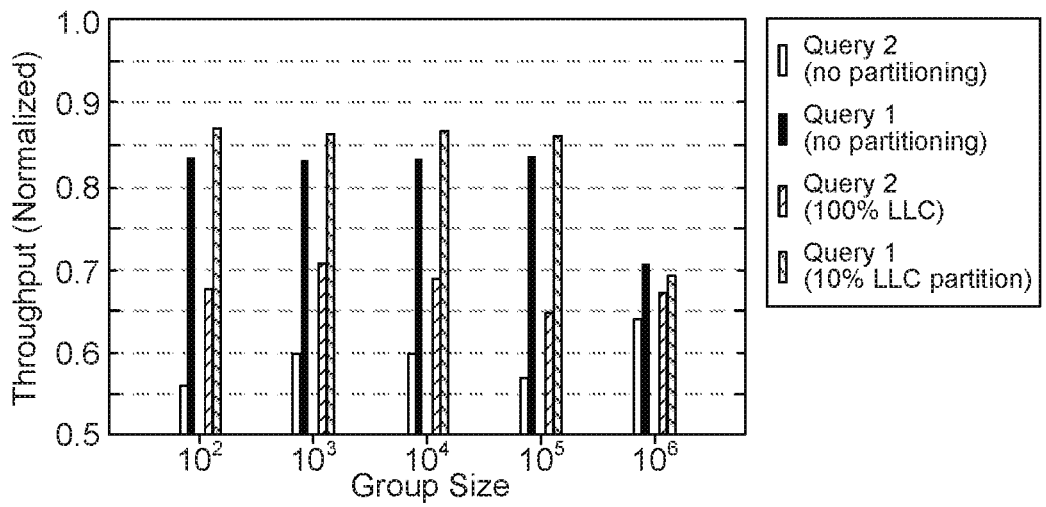
Figure 8C:
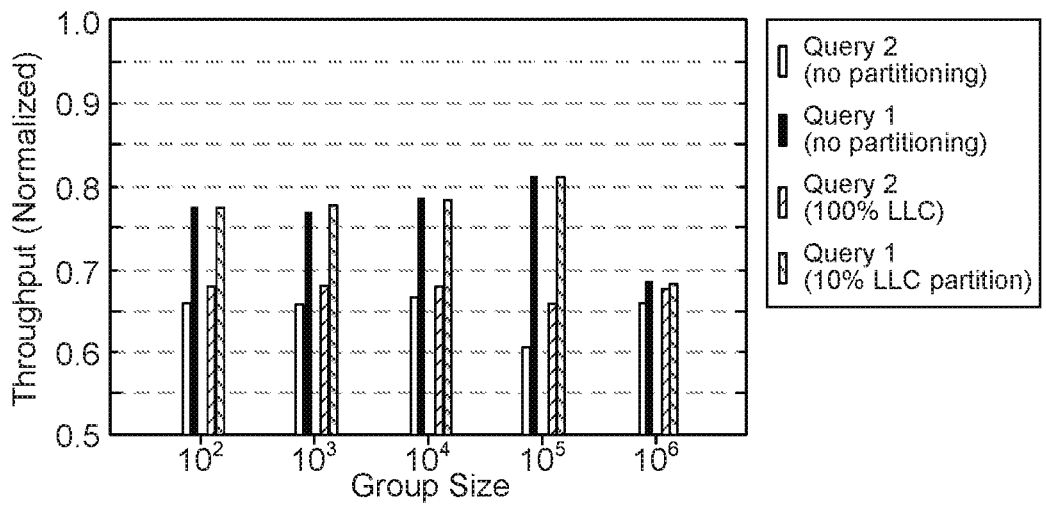

Practical performance gains may be seen in examples or test benchmarks that may combine multiple types of queries, simulating or creating a mixed workload of transactional queries combined with and different types of analytical queries of various operators, or also analytical workloads of multiple analytical queries without necessarily including transactional queries, for some other embodiments. Where at least one query may be cache-insensitive, performance benefits may be further apparent. For example, FIGS. 8A-8C show example side-by-side performance comparisons of concurrently running Query 1 and Query 2 on the same processor without partitioning, and again with partitioning, where Query 2 has a bitmask allowing unrestricted LLC access (effectively un-partitioned) alongside Query 1 in a partition having evict/write access to only 10% of cache. FIGS. 8A-8C have the same varied group sizes and have the same dictionary sizes as FIGS. 6A-6C, respectively.

In most of these example test queries, it may be seen that performance of Query 2 may be at least the same if not significantly improved when Query 1 is restricted to a 10% LLC partition. Query 1, even when restricted, incurs minimal if any adverse effect on its performance, and may even perform significantly better in some cases, showing marked improvement in performance for both Query 1 and Query 2 when cache-insensitive Query 1 is restricted to a relatively small petition of LLC.

With respect to Query 3, FIG. 7 demonstrates that foreign key join operations are sensitive to the size of the cache, in some embodiments and use cases, depending on cardinality of the primary keys. In some non-limiting examples, foreign key joins may be cache-insensitive and cause cache pollution where the size of the corresponding bit vector for the foreign key join is not comparable to the size of the LLC (i.e., not fitting within the cache). In some embodiments, if the corresponding bit vector does fit within the LLC, such as when the bit vector is approximately the same size, but not exceeding the size, of available cache in the LLC, the foreign key join then may become cache-sensitive.

Thus, in the examples of FIG. 7, the greatest cache insensitivity is in the primary key of one billion values, because the corresponding bit vector, on the order of $10^9$ bits (over 119.2 MiB), is more than twice the size of the 55 MiB LLC. Dropping an order of magnitude to a bit vector of $10^8$ bits, corresponding to a primary key of 100 million values, this bit vector then fits within LLC and is cache-sensitive, specifically for this LLC.

With bit vectors of $10^7$ bits or smaller, in this non-limiting example, cache-sensitivity is also negligible, not because of exceeding available LLC size, but instead because the smaller bit vectors may fit mostly or completely inside a higher level of cache (e.g., L2 cache, where the shared LLC is L3 cache, per FIG. 3B), and thereby leverage locality for speeds that are almost uniformly fast. For the large bit vectors exceeding LLC size, cache-insensitive foreign key joins may have roughly uniform throughput (for similar normalized metrics), but it may be noticeably slower in objective terms than operations running from higher levels of cache on a core, for example.

As a result, in some embodiments, an implementer, administrator, or automated program or script in an operating system or DBMS, for example, may derive a heuristic based on the expected size of a bit vector as compared with LLC size, and/or further, in some embodiments, with respect to a difference of LLC and higher-level caches, which may or may not be shared. This further comparison may be of additional help specifically for implementations with hierarchical caches having at least one level, for example, LLC, shared across multiple cores.

Thus, for purposes of testing the enhanced cache partitioning embodiments disclosed herein, applying heuristics such as those described above, a 10% LLC partition may be applied in one test (0x00003 in a 20-way associative cache), and a 60% LLC partition may be applied in another test (0x00fff in the same cache, i.e., binary 0000 0000 1111 1111 1111) depending on predicted cache sensitivity of each type of expected foreign key join operation.

Cache-insensitive foreign key joins, like column scan operations, may perform as well with only a 10% LLC partition. However, cache-sensitive foreign key joins (e.g., operating with bit vectors ranging in size from the size of the LLC down to the size of the LLC less the size of the next-higher-level cache) may need more of the cache to perform better, but still may not need as much as an aggregation with grouping, having a more linear normalized performance degradation. These patterns are shown in FIGS. 9A and 9B. FIG. 9A involves foreign key joins with one million primary key values. FIG. 9B involves foreign key joins with 100 million primary key values, in the same 55 MiB LLC, for purposes of the illustrated examples.

Looking at Query 2 in common, FIG. 9A shows a cache partitioning scheme similar to that of FIGS. 8A-8C, running cache-sensitive Query 2 concurrently alongside a cache-insensitive query (Query 3 in FIG. 9A, or Query 1 in FIGS. 8A-8C). The results shown in FIG. 9A are similar, if not more pronounced, than the results of FIG. 8B, for example, in which the normalized throughput of the cache-insensitive query (Query 3, in FIG. 9A) may be approximately the same if not significantly better, even if only allowed to evict in 10% of the cache, while normalized throughput of the cache-sensitive query may improve dramatically across each of the tests.

Evaluations such as those shown in the example of FIGS. 8A-9B may thus confirm whether certain operations, such as aggregations with grouping operations and/or some join operations, are sensitive to cache pollution either caused by cache-insensitive operations, for example, such as column scan operations or certain other join operations. Aggregations and/or grouping operations may be most sensitive to cache pollution when the size of their performance-critical data structures is comparable to the size of the LLC, as described above.

While the column scan operator typically may pollute the cache because it may continuously evict cache lines and may not re-use data, the join operator may cause cache pollution when its frequently accessed data structures fit in the next-higher-level cache, or else may be too large to fit in any of the cache (at least in the LLC, depending on inclusivity). In these cases, cache pollution may be significantly reduced if not eliminated, and performance may be significantly improved as a result, by restricting cache-insensitive operations, such as the column scan or cache-insensitive join, to relatively small portion (e.g., no more than 10%, in some embodiments) of the LLC. In addition, the column scan operator and some cache-insensitive join operators may even profit from the fact that aggregation consumes less memory bandwidth, as well: in some example cases, throughput of these cache-insensitive operations may also increase, in some embodiments.

Similarly, if the data structures used by join operations are comparable to the size of the available LLC, such join operations may likely be cache-sensitive, and the aggregation-with-grouping operators and the join operators may then compete with each other for cache capacity. Thus, a different cache partitioning scheme may be needed to yield similar performance improvements. In some embodiments, restricting the cache-sensitive join to 60% of the cache may still yield some performance improvements, but the improvements may not be as dramatic in many of these cases of competing cache-sensitive operators. Generally, achieving better levels of improved performance based on partitioning in any given situation may depend on generating more accurate result size estimates.

Figure 10:
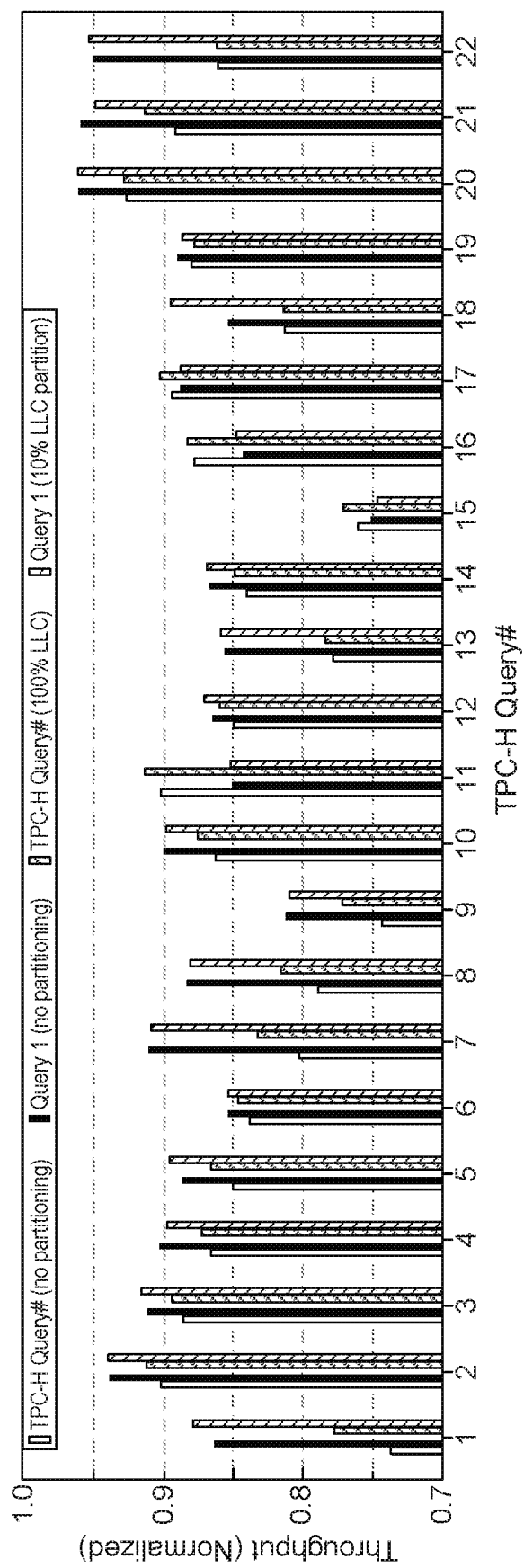
FIG. 10 is an example graph illustrating effects of enhanced cache partitioning techniques as applied to a standard database benchmark, according to an embodiment.

FIG. 10 shows results of an example TPC-H benchmark run on the same test hardware implementation as described above, in order to evaluate whether limiting scans improves performance of a representative variety of OLAP workloads. These measurements show that the performance of TPC-H Queries 1, 7, 8 and 9 may improve as a result of partitioning the cache according to the enhanced cache partitioning techniques disclosed herein, because these queries each may frequently access a column with a large dictionary. The performance of the other queries, however, may not improve noticeably. This may serve to demonstrate that not all queries are sensitive to cache pollution. The size of the working set, for example, affecting dictionary and hash table sizes, may then determine whether the performance of an operator depends on the size of the available LLC, in some embodiments.

Figures 11A, 11B:
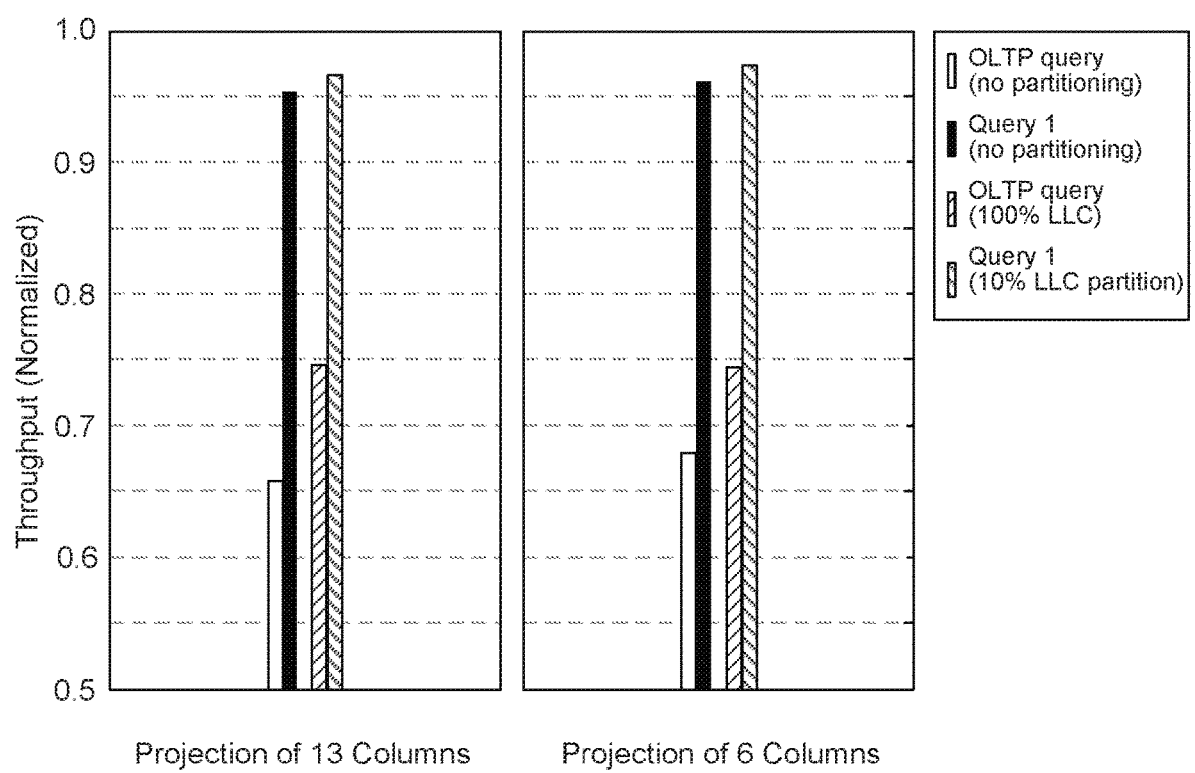
FIGS. 11A-11B are example graphs illustrating effects of enhanced cache partitioning techniques as applied to real-world examples of mixed workloads with real business data, according to an embodiment.

FIGS. 11A and 11B similarly show results of example experiments with the column scan (OLAP) following an OLTP query from a real-world business application. The results may serve to demonstrate that the performance of the OLTP query may degrade significantly in a base configuration. This may be because OLTP queries, according to some embodiments, tend to use dictionaries aggressively, which the OLAP queries tend to evict from the cache. By using cache partitioning to restrict the OLAP query to a relatively small portion (e.g., 10%) of the cache, such eviction of dictionaries may be avoided, thereby improving performance of the OLTP query. Overall throughput of mixed workloads may thus be improved.

Thus, the examples shown in FIGS. 4-11B indicate that partitioning may improve the performance of any concurrent workload containing a mix of cache-insensitive and cache-sensitive operators. In addition, another advantage is that this type of partitioning scheme may be used independently of any further knowledge of the workload, which may further improve ease of use for DBMS implementers who may choose to leverage one or more of the enhanced cache partitioning embodiments described herein.

Furthermore, the examples described herein show how to integrate a cache partitioning mechanism into a query execution engine of an existing DBMS in a cost-efficient manner. The empirical data shown herein demonstrate that this approach may avoid cache pollution and may significantly reduce cache misses. By partitioning the cache, in the manner described herein using enhanced techniques, overall system performance may be improved and measured for custom queries targeting column scans, aggregations, and joins, as well as for the TPC-H benchmark and modern real-world HTAP business applications, for example. Looking at overall throughput for DBMS with both analytical and mixed (transactional and analytical) workloads, implementing such enhanced techniques may typically pay off, with net improvement in performance outweighing any throughput drawback or overhead of implementation.

Aside from using the enhanced cache partitioning techniques described herein, other ways of managing analytical or mixed workloads may be similarly effective independent of cache partitioning. For example, it may make sense performance-wise to ensure that a DBMS may concurrently run operators with high cache pollution characteristics (e.g., Query 1 and cache-insensitive instances of Query 3 together), but let cache-sensitive queries (e.g., Query 2 and cache-sensitive Query 3) run alone instead, for example. This kind of query planning may be used separately from or together with the enhanced cache partitioning techniques described herein, which may result in additional incremental benefits in overall throughput and performance.

Figure 14:
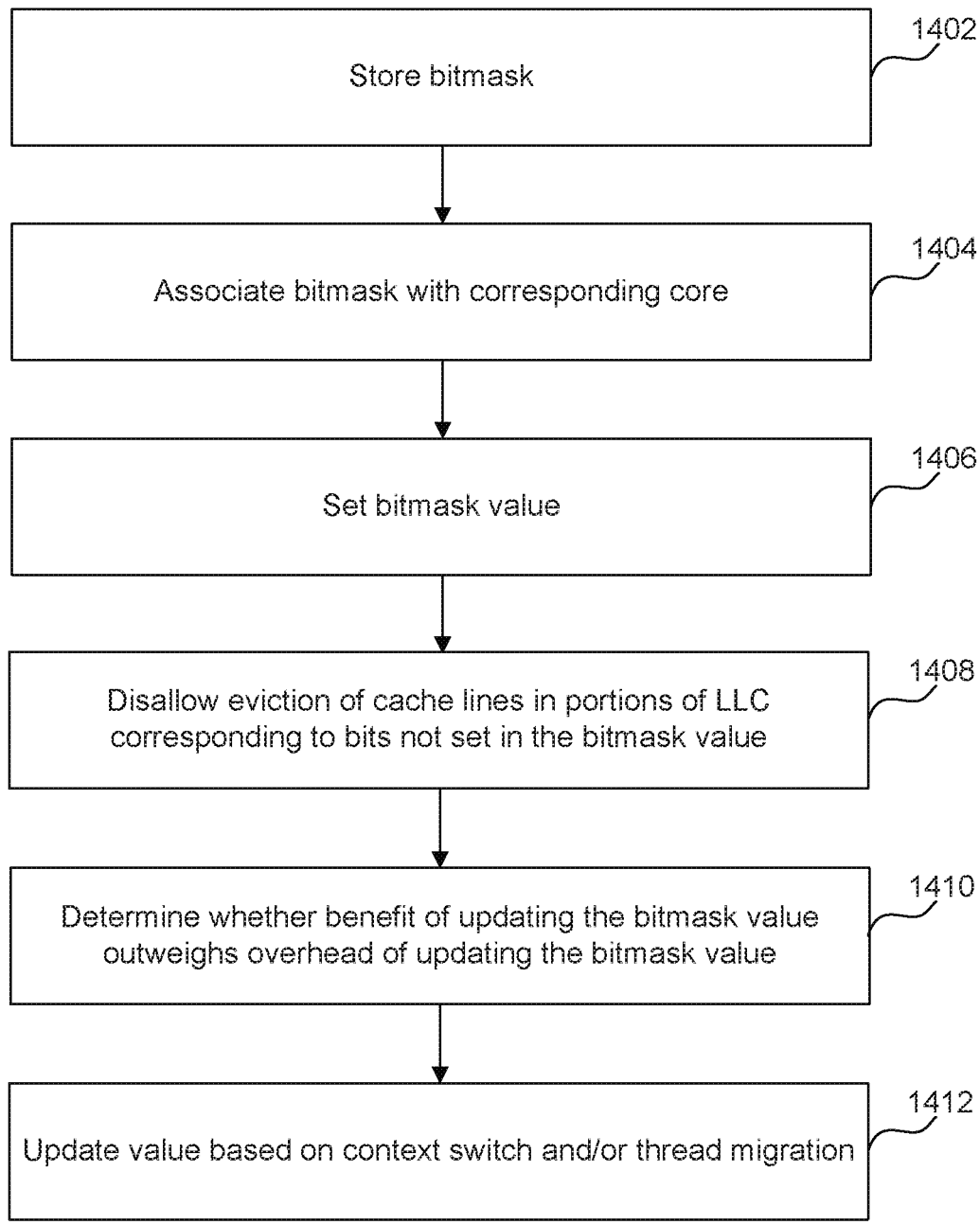
FIG. 14 is a flowchart illustrating a method for partitioning a cache, implementing enhanced cache partitioning techniques, according to some embodiments.

FIG. 14 is a flowchart illustrating a method 1400 for partitioning a cache, implementing enhanced cache partitioning techniques, according to an embodiment. Method 1400 may be performed by processing logic that may comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order from that shown in FIG. 14, as will be understood by a person of ordinary skill in the art.

Method 1400 shall be described with reference to FIGS. 1, 3, and 15. However, method 1400 is not limited to that example embodiment.

In 1402, at least one processor 1504 may be configured to store a bitmask. One non-limiting example of bitmasks, according to some embodiments, may be illustrated in FIG. 1, in which 120 and 140 show different bitmasks corresponding to different respective cores 110 and 130 of a processor. In some embodiments, processor 1504 may need to be specially configured to store such bitmasks, such as by way of a bitmask enable flag, jumper, firmware option, or microcode, to name a few non-limiting examples.

FIG. 1 is a block diagram depicting one non-limiting example of a cache partitioning scheme according to the enhanced cache partitioning techniques disclosed herein, according to an embodiment. FIG. 1 may employ, for example, Cache Allocation Technology (CAT), according to some embodiments.

With respect to FIG. 1, for example, bitmasks 120 or 140 may correspond to different parts of a last-level cache (LLC) 150. The different parts may be any combination of portions 160-190 of LLC 150. For example, for purely illustrative purposes of the non-limiting example shown in FIG. 1, the value of bitmask 140 is 0001. This shows a bit as being set, and that bit corresponds to 190, representing a first portion of LLC 150. The other bits not set correspond to the remaining portions of LLC 150, being 160-180.

In 1404, processor 1504 may associate bitmask 120 with a corresponding core 110; similarly, in the example of FIG. 1, bitmask 140 may correspond to core 130. According to some embodiments, depending on variations in the individual architecture of a given DBMS, processor(s) or cores, and/or memory (including cache hierarchy), association of bitmasks with cores may be done in hardware, software, or any combination thereof, at any level in any system hierarchy or structure. In further non-limiting example embodiments, this association may extend to specific process identifiers or thread identifiers, whereby a process or thread may be associated with a given core, which may further reduce the likelihood of that core needing to update a bitmask value.

In 1406, processor 1504 may set a value of any of the bitmasks, such as 120 and/or 140. In some embodiments, processor 1504 may receive data from a query execution engine of a DBMS, via a kernel. For example, the query execution engine may correspond to execution engine 202, which may pertain to a DBMS (not shown) or which may act independently; kernel may be an operating system kernel, and may function as shown in 204, allowing execution engine 202 and/or DBMS directly to write to the kernel, such as via a driver, module, application binary interface (ABI), or other interface.

In 1408, processor 1504 may disallow eviction of cache lines, in portions of LLC corresponding to bits not set in the bitmask value, by the core associated with the corresponding bitmask. Conversely, processor 1504 may allow the same core associated with the bitmask to evict cache lines in portions of LLC that do have corresponding bits set in the bitmask. According to some implementation variations, processor 1504 may instead allow eviction of cache lines, in portions of LLC corresponding to bits not set in the bitmask value, by the core associated with the corresponding bitmask, and instead disallow the same core associated with the bitmask to evict cache lines in portions of LLC that do have corresponding bits set in the bitmask.

To disallow eviction of cache lines, processor 1504 may be configured to make eviction impossible for a core to perform, according to its corresponding bitmask, without necessarily having to block an actual eviction attempt. Similarly, to allow eviction of cache lines, processor 1504 may be configured to make eviction possible for a core to perform, according to its corresponding bitmask, without necessarily performing an actual eviction.

Any eviction may be performed according to other cache eviction techniques or algorithms, as will be appreciated by persons skilled in the art. In some embodiments, disallowing eviction may not necessarily require that eviction be impossible, but rather may require that a higher threshold for eviction be met, compared to other instances of cache line eviction in the DBMS. For example, thresholds for frequency of use or recency of use may be adjusted so as to disfavor eviction. While such adjusted thresholds may improve performance in some use cases, other use cases may benefit from disallowing evictions to the effect that a core is prevented from performing any cache line eviction in designated part(s) of LLC specified by a value of bits in its corresponding bitmask.

In 1410, processor 1504 may determine whether a benefit of updating the bitmask value may outweigh an overhead of updating the bitmask value. As described above, using the bitmask in the various manners described herein may partition cache per core and/or per process and/or thread, beneficially improving performance of some analytical or mixed workloads.

In embodiments where updating the bitmask value may incur some performance overhead, such as time (latency), energy, or other computing resources that may otherwise have been used elsewhere, a processor or system may improve performance and/or reduce thrashing by including this determination based on a cost-benefit analysis, in at least some cases when it may have a chance to update the bitmask value for a corresponding process or thread running on a given core. One other design consideration in addition may be that this determination and/or cost-benefit analysis itself may incur some additional overhead as a result, and any designs or determinations may also need to take this factor into consideration.

In some embodiments, the overhead may be measured and/or estimated in advance, providing a predetermined value by which to make the determination in 1410. In some embodiments, the overhead may be tested, measured, estimated, and/or calculated in real time, which may provide more accurate determinations. Similarly, the benefit of a given bitmask value may be measured and/or estimated in advance, providing a predetermined value by which to make the determination in 1410. In some embodiments, this benefit may also be more granularly defined with respect to a certain type of workload, data set, operator, and/or query, to name a few non-limiting examples. Further, the benefit may be tested, measured, estimated, and/or calculated in real time, which also may provide more accurate determinations In 1412, processor 1504 may update a value of a bitmask. This action may be referred to as updating the bitmask, or updating the bits of the bitmask. In performing this action, processor 1504 may set, unset, and/or toggle at least one bit of the bitmask, and/or apply another bitmask using bitwise logic, to name some non-limiting examples. This action of updating may be performed in the event of (or, in some embodiments, only in the event of) a determination in 1410 that a benefit of updating the bitmask value outweighs the overhead of updating the bitmask value. Additionally or alternatively, this updating may be performed in response to a context switch and/or thread migration with respect to the corresponding core, such that any new process or thread running on the same core at a different time may benefit more from having a different bitmask, thus having a different cache partitioning scheme on amount of cache that the core may be able to evict lines from.

Method 1400 is disclosed in the order shown above in this exemplary embodiment of FIG. 14. In practice, however, the operations disclosed above, alongside other operations, may be executed sequentially in any order, or they may alternatively be executed concurrently, with more than one operation being performed simultaneously, or any combination of the above. Additionally or alternatively, any simultaneous, concurrent, or sequential operations may be performed simultaneously, concurrently, and/or sequentially within any given core and/or with respect to multiple cores, and independently of or dependently on any other cores in the same processor or any processors that may be running in other sockets, for example.

Figure 15:
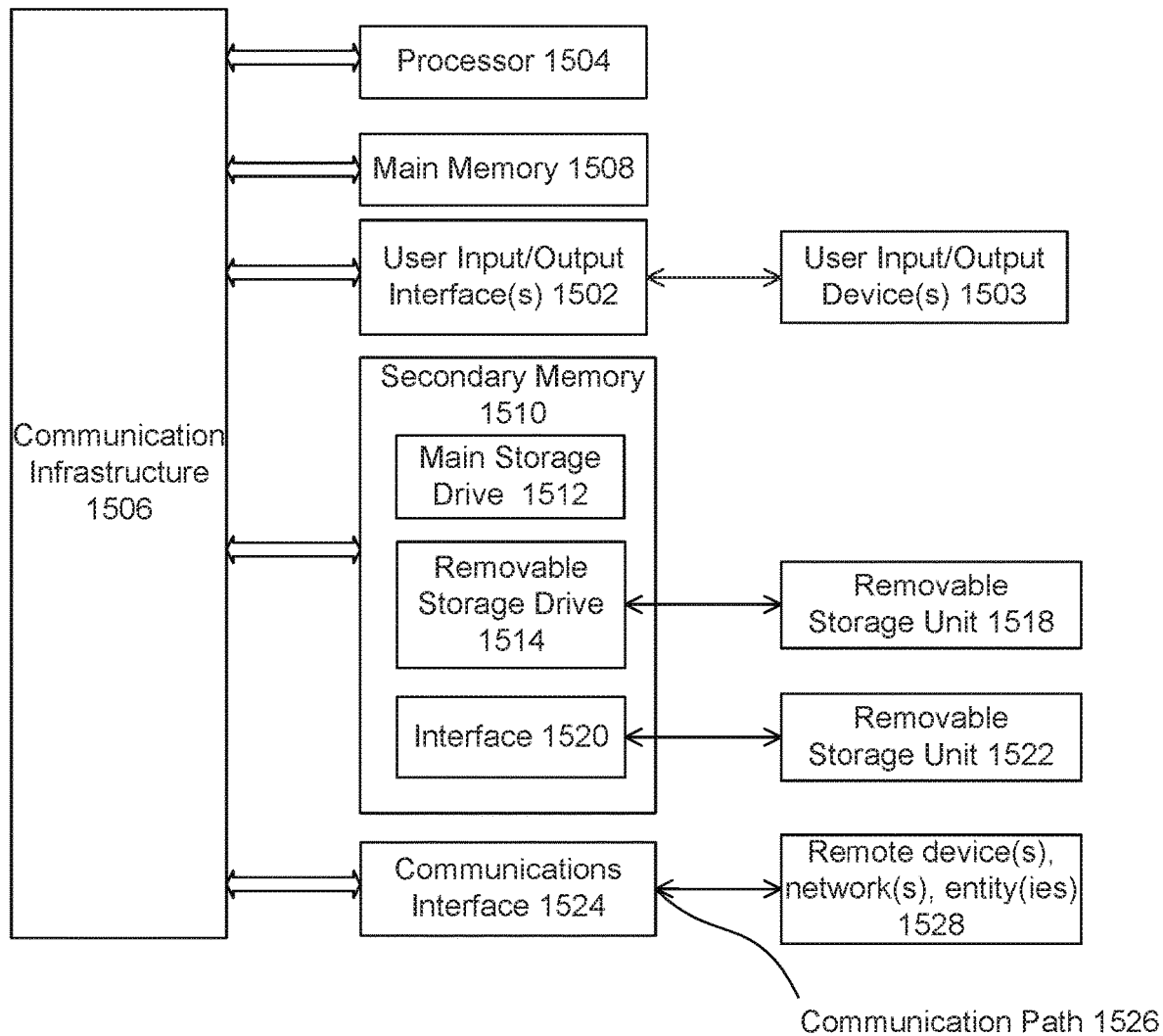
FIG. 15 is an example computer system useful for implementing various embodiments.

Various embodiments may be implemented, for example, using one or more well-known computer systems, such as computer system 1500 shown in FIG. 15. One or more computer systems 1500 may be used, for example, to implement any of the embodiments discussed herein, as well as combinations and sub-combinations thereof.

Computer system 1500 may include one or more processors (also called central processing units, or CPUs), such as a processor 1504. Processor 1504 may be connected to a bus or communication infrastructure 1506.

Computer system 1500 may also include user input/output device(s) 1503, such as monitors, keyboards, pointing devices, etc., which may communicate with communication infrastructure 1506 through user input/output interface(s) 1502.

One or more of processors 1504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, vector processing, array processing, etc., as well as cryptography (including brute-force cracking), generating cryptographic hashes or hash sequences, solving partial hash-inversion problems, and/or producing results of other proof-of-work computations for some blockchain-based applications, for example.

Additionally, one or more of processors 1504 may include a coprocessor or other implementation of logic for accelerating cryptographic calculations or other specialized mathematical functions, including hardware-accelerated cryptographic coprocessors. Such accelerated processors may further include instruction set(s) for acceleration using coprocessors and/or other logic to facilitate such acceleration.

Computer system 1500 may also include a main or primary memory 1508, such as random access memory (RAM). Main memory 1508 may include one or more levels of cache. Main memory 1508 may have stored therein control logic (i.e., computer software) and/or data.

Computer system 1500 may also include one or more secondary storage devices or secondary memory 1510. Secondary memory 1510 may include, for example, a main storage drive 1512 and/or a removable storage device or drive 1514. Main storage drive 1512 may be a hard disk drive or solid-state drive, for example. Removable storage drive 1514 may be a floppy disk drive, a magnetic tape drive, a compact disk drive, an optical storage device, tape backup device, and/or any other storage device/drive.

Removable storage drive 1514 may interact with a removable storage unit 1518. Removable storage unit 1518 may include a computer usable or readable storage device having stored thereon computer software (control logic) and/or data. Removable storage unit 1518 may be a floppy disk, magnetic tape, compact disk, DVD, optical storage disk, and/any other computer data storage device. Removable storage drive 1514 may read from and/or write to removable storage unit 1518.

Secondary memory 1510 may include other means, devices, components, instrumentalities or other approaches for allowing computer programs and/or other instructions and/or data to be accessed by computer system 1500. Such means, devices, components, instrumentalities or other approaches may include, for example, a removable storage unit 1522 and an interface 1520. Examples of the removable storage unit 1522 and the interface 1520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1500 may further include a communication or network interface 1524. Communication interface 1524 may enable computer system 1500 to communicate and interact with any combination of external devices, external networks, external entities, etc. (individually and collectively referenced by reference number 1528). For example, communication interface 1524 may allow computer system 1500 to communicate with external or remote devices 1528 over communication path 1526, which may be wired and/or wireless (or a combination thereof), and which may include any combination of LANs, WANs, the Internet, etc. Control logic and/or data may be transmitted to and from computer system 1500 via communication path 1526.

Computer system 1500 may also be any of a personal digital assistant (PDA), desktop workstation, laptop or notebook computer, netbook, tablet, smart phone, smart watch or other wearable, appliance, part of the Internet of Things (IoT), and/or embedded system, to name a few non-limiting examples, or any combination thereof.

It should be appreciated that the framework described herein may be implemented as a method, process, apparatus, system, or article of manufacture such as a non-transitory computer-readable medium or device. For illustration purposes, the present framework may be described in the context of distributed ledgers being publicly available, or at least available to untrusted third parties. One example as a modern use case is with blockchain-based systems. It should be appreciated, however, that the present framework may also be applied in other settings where sensitive or confidential information may need to pass by or through hands of untrusted third parties, and that this technology is in no way limited to distributed ledgers or blockchain uses.

Computer system 1500 may be a client or server, accessing or hosting any applications and/or data through any delivery paradigm, including but not limited to remote or distributed cloud computing solutions, local or on-premises software (e.g., "on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), database as a service (DBaaS), etc.); and/or a hybrid model including any combination of the foregoing examples or other services or delivery paradigms.

Any applicable data structures, file formats, and schemas may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

Any pertinent data, files, and/or databases may be stored, retrieved, accessed, and/or transmitted in human-readable formats such as numeric, textual, graphic, or multimedia formats, further including various types of markup language, among other possible formats. Alternatively or in combination with the above formats, the data, files, and/or databases may be stored, retrieved, accessed, and/or transmitted in binary, encoded, compressed, and/or encrypted formats, or any other machine-readable formats.

Interfacing or interconnection among various systems and layers may employ any number of mechanisms, such as any number of protocols, programmatic frameworks, floorplans, or application programming interfaces (API), including but not limited to Document Object Model (DOM), Discovery Service (DS), NSUserDefaults, Web Services Description Language (WSDL), Message Exchange Pattern (MEP), Web Distributed Data Exchange (WDDX), Web Hypertext Application Technology Working Group (WHATWG) HTML5 Web Messaging, Representational State Transfer (REST or RESTful web services), Extensible User Interface Protocol (XUP), Simple Object Access Protocol (SOAP), XML Schema Definition (XSD), XML Remote Procedure Call (XML-RPC), or any other mechanisms, open or proprietary, that may achieve similar functionality and results.

Such interfacing or interconnection may also make use of uniform resource identifiers (URI), which may further include uniform resource locators (URL) or uniform resource names (URN). Other forms of uniform and/or unique identifiers, locators, or names may be used, either exclusively or in combination with forms such as those set forth above.

Any of the above protocols or APIs may interface with or be implemented in any programming language, procedural, functional, or object-oriented, and may be compiled or interpreted. Non-limiting examples include C, C++, C#, Objective-C, Java, Swift, Go, Ruby, Perl, Python, JavaScript, WebAssembly, or virtually any other language, with any other libraries or schemas, in any kind of framework, runtime environment, virtual machine, interpreter, stack, engine, or similar mechanism, including but not limited to Node.js, V8, Knockout, jQuery, Dojo, Dijit, OpenUI5, AngularJS, Express.js, Backbone.js, Ember.js, DHTMLX, Vue, React, Electron, and so on, among many other non-limiting examples.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 1500, main memory 1508, secondary memory 1510, and removable storage units 1518 and 1522, as well as tangible articles of manufacture embodying any combination of the foregoing. Such control logic, when executed by one or more data processing devices (such as computer system 1500), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 15. In particular, embodiments may operate with software, hardware, and/or operating system implementations other than those described herein.

It is to be appreciated that the Detailed Description section, and not any other section, is intended to be used to interpret the claims. Other sections may set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries may be defined as long as the specified functions and relationships (or equivalents thereof) are appropriately performed. Also, alternative embodiments may perform functional blocks, steps, operations, methods, etc. using orderings different from those described herein.

References herein to "one embodiment," "an embodiment," "an example embodiment," "some embodiments," or similar phrases, indicate that the embodiment described may include a particular feature, structure, or characteristic, but every embodiment may not necessarily include the particular feature, structure, or characteristic. Moreover, such phrases are not necessarily referring to the same embodiment.

Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method for partitioning a hierarchical cache having a shared n-way associative last-level cache (LLC), comprising:
    receiving, by at least one processor, a first bitmask from a database management system (DBMS) via an operating-system kernel interface, wherein the first bitmask comprises n bits, wherein n is a predetermined number equal to the number of ways in the LLC;
    storing, by the at least one processor, the first bitmask;
    associating, by the at least one processor, the first bitmask with a first core of the at least one processor, wherein the at least one processor comprises at least one multi-core processor;
    setting, by the at least one processor, a subset of the bits of the first bitmask, wherein the subset of the bits of the first bitmask represents at least one first portion of the LLC, and wherein any part of the first bitmask excluding the subset of the bits of the first bitmask represents at least one second portion of the LLC;
    disallowing, by the at least one processor, eviction of any cache line in the at least one second portion of the LLC by the first core of the at least one processor;
    receiving, by the at least one processor, a plurality of queries via the DBMS, wherein the plurality of queries comprises at least one online analytical processing (OLAP) query and at least one online transactional processing (OLTP) query;
    executing the at least one OLAP query using the first core of the at least one processor and only the first portion of the LLC represented by the first subset of bits of the first bitmask; and
    executing the at least one OLTP query using any core of the at least one processor and any portion of the LLC.

2. The computer-implemented method of claim 1, wherein the at least one OLAP query comprises at least one cache-insensitive foreign key join, and wherein the at least one OLTP operation comprises at least one cache-sensitive foreign key join.

3. The computer-implemented method of claim 1, the storing the first bitmask further comprising:
    updating, by the at least one processor, the setting of the subset of bits of the first bitmask, based on whether the at least one OLAP query comprises at least one operator, of a first set of predetermined operators, corresponding to at least one of a process running on the first core of the at least one processor or a thread running on the first core of the at least one processor.

4. The computer-implemented method of claim 3, the updating further comprising:
    updating, by the at least one processor, the setting of the subset of bits of the first bitmask, only in response to determining, by the at least one processor, that a predicted benefit value of the updating outweighs a predicted overhead value of the updating.

5. The computer-implemented method of claim 3, wherein the updating is responsive to at least one of a context switch or a thread migration.

6. The computer-implemented method of claim 3, further comprising:
    storing, by the at least one processor, a second bitmask, wherein the second bitmask comprises n bits;
    associating, by the at least one processor, the second bitmask with at least one second core of the at least one processor;
    setting, by the at least one processor, a subset of the bits of the second bitmask, wherein the subset of the bits of the second bitmask represents at least one third portion of the LLC, and wherein any part of the second bitmask excluding the subset of the bits of the second bitmask represents at least one fourth portion of the LLC; and
    disallowing, by the at least one processor, eviction of any cache line in the at least one fourth portion of the LLC by at least one second core of the at least one processor.

7. The computer-implemented method of claim 6, the storing the second bitmask further comprising:
    updating, by the at least one processor, the setting of the subset of bits of the second bitmask, based on whether the at least one OLTP query comprises at least one operator, of a second set of predetermined operators, corresponding to at least one of a process running on the second core of the at least one processor or a thread running on at least one second core of the at least one processor.

8. The computer-implemented method of claim 1, wherein the at least one OLAP query and the at least one OLTP query are performed concurrently in hybrid transactional/analytical processing (HTAP).

9. The computer-implemented method of claim 1, wherein the at least one second portion of the LLC contains data comprising at least one dictionary referenced by the executing the at least one OLTP query.

10. The computer-implemented method of claim 9, wherein the at least one dictionary referenced by the executing the at least one OLTP query remains in the at least one second portion of the LLC after the executing a first OLAP query of the at least one OLAP query.

11. The computer-implemented method of claim 9, wherein the at least one dictionary is referenced for compression or decompression of columnar data stored in a memory via the DBMS.

12. An in-memory database management system (DBMS), comprising:
    a memory comprising a hierarchical cache having a shared n-way associative last-level cache (LLC); and
    at least one processor, communicatively coupled to the memory, and configured to perform operations comprising:
        store a first bitmask, via an operating-system kernel interface, wherein the first bitmask comprises n bits, wherein n is a predetermined number equal to the number of ways in the LLC;
        associate the first bitmask with a first core of the at least one processor, wherein the at least one processor comprises at least one multi-core processor;
        set a value of a subset of the bits of the first bitmask, wherein the subset of the bits of the first bitmask represents at least one first portion of the LLC, and wherein any part of the first bitmask excluding the subset of the bits of the first bitmask represents at least one second portion of the LLC;

disallow eviction of any cache line in the at least one second portion of the LLC by the first core of the at least one processor;

execute at least one online transactional processing (OLAP) query using the first core of the at least one processor and only the first portion of the LLC represented by the first subset of bits of the first bitmask; and execute at least one online transactional processing (OLTP) query using any core of the at least one processor and any portion of the LLC.

13. The DBMS of claim 12, wherein the at least one OLAP query comprises at least one cache-insensitive foreign key join, and wherein the at least one OLTP operation comprises at least one cache-sensitive foreign key join.

14. The DBMS of claim 12, wherein, to store the first bitmask, the at least one processor is further configured to:
update the value of the subset of bits of the first bitmask, based on whether the at least one OLAP query comprises at least one operator, of a first set of predetermined operators, corresponding to at least one of a process running on the first core of the at least one processor or a thread running on the first core of the at least one processor.

15. The DBMS of claim 14, wherein, to update the value of the subset of bits of the first bitmask, the at least one processor is further configured to:
update the value of the subset of bits of the first bitmask, only in response to a determination that a predicted benefit value of the updating outweighs a predicted overhead value of the updating.

16. The DBMS of claim 14, wherein, to update the value of the subset of bits of the first bitmask, the at least one processor is further configured to:
update the value of the subset of bits of the first bitmask in response to at least one of a context switch or a thread migration.

17. The DBMS of claim 14, the at least one processor further configured to:
store a second bitmask, wherein the second bitmask comprises n bits;
associate the second bitmask with a second core of the at least one processor;
set a subset of the bits of the second bitmask, wherein the subset of the bits of the second bitmask represents at least one third portion of the LLC, and wherein any part of the second bitmask excluding the subset of the bits of the second bitmask represents at least one fourth portion of the LLC; and
disallow eviction of any cache line in the at least one fourth portion of the LLC by the second core of the at least one processor.

18. The DBMS of claim 17, wherein, to store the second bitmask, the at least one processor is further configured to:
update the setting of the subset of bits of the second bitmask, based on whether the at least one OLTP query comprises at least one operator, of a second set of predetermined operators, corresponding to at least one of a process running on the second core of the at least one processor or a thread running on the second core of at least one at least one processor.

19. A non-transitory computer-readable device having instructions stored thereon that, when executed by at least one computing device comprising at least one processor coupled to a hierarchical cache having a shared n-way associative last-level cache (LLC), cause the at least one computing device to perform operations comprising:

receiving a first bitmask from a database management system (DBMS) via an operating-system kernel interface, wherein the first bitmask comprises n bits, wherein n is a predetermined number equal to the number of ways in the LLC;

storing, the first bitmask;

associating the first bitmask with a first core of the at least one processor, wherein the at least one processor comprises at least one multi-core processor;

setting a subset of the bits of the first bitmask, wherein the subset of the bits of the first bitmask represents at least one first portion of the LLC, and wherein any part of the first bitmask excluding the subset of the bits of the first bitmask represents at least one second portion of the LLC;

disallowing eviction of any cache line in the at least one second portion of the LLC by the first core of the at least one processor;

receiving, by the at least one processor, a plurality of queries via the DBMS, wherein the plurality of queries comprises at least one online analytical processing (OLAP) query and at least one online transactional processing (OLTP) query;

executing the at least one OLAP query using the first core of the at least one processor and only the first portion of the LLC represented by the first subset of bits of the first bitmask; and executing the at least one OLTP query using any core of the at least one processor and any portion of the LLC.

20. The non-transitory computer-readable device of claim 19, the operations further comprising:
updating the setting of the subset of bits of the first bitmask, based on whether the at least one OLAP query comprises at least one operator, of a first set of predetermined operators, corresponding to at least one of a process running on the first core of the at least one processor or a thread running on the first core of the at least one processor;
storing a second bitmask, wherein the second bitmask comprises n bits;
associating the second bitmask with at least one second core of the at least one processor;
setting a subset of the bits of the second bitmask, wherein the subset of the bits of the second bitmask represents at least one third portion of the LLC, and wherein any part of the second bitmask excluding the subset of the bits of the second bitmask represents at least one fourth portion of the LLC;
disallowing eviction of any cache line in the at least one fourth portion of the LLC by the second core of the at least one processor; and
updating the setting of the subset of bits of the second bitmask, based on whether the at least one OLTP query comprises at least one operator, of a second set of predetermined operators, corresponding to at least one of a process running on the second core of the at least one processor or a thread running on at least one second core of the at least one processor.

* * * * *